United States Patent [19]
Warehime

[11] Patent Number: 5,908,349
[45] Date of Patent: Jun. 1, 1999

[54] FLUID JET CUTTING AND SHAPING SYSTEM

[76] Inventor: Kevin S. Warehime, 2375 Feeser Rd., Taneytown, Md. 21787

[21] Appl. No.: 08/881,198

[22] Filed: Jun. 24, 1997

Related U.S. Application Data

[62] Division of application No. 08/703,462, Aug. 27, 1996, Pat. No. 5,782,673.

[51] Int. Cl.$^6$ ....................................................... B24C 5/04
[52] U.S. Cl. ........................... 451/102; 451/101; 451/75; 239/430; 239/433
[58] Field of Search .............................. 451/102, 99, 101, 451/38, 90, 75, 88, 87; 239/429, 430, 433, 310, 318, 591, 600; 83/177

[56] References Cited

U.S. PATENT DOCUMENTS

| | | | |
|---|---|---|---|
| 2,628,456 | 2/1953 | Berg | 451/87 |
| 3,532,014 | 10/1970 | Franz | 83/177 |
| 3,972,150 | 8/1976 | Hart | 451/102 |
| 4,204,448 | 5/1980 | Pearl | 83/177 |
| 4,478,368 | 10/1984 | Yie | 239/430 |
| 4,545,157 | 10/1985 | Saurwein | 451/102 |

(List continued on next page.)

OTHER PUBLICATIONS

Ingersoll–Rand®, "Equipment Specification for Ingersoll–Rand Waterjet Systems," which accompanied a proposal dated Jul. 11, 1994 (some earlier dates printed on some documents in the compilation of proposed documents), price amounts have been redacted for confidentiality purposes.

Mitutoyo Mfg. Co., Ltd. product brochure entitled, Coordinate Measuring Machines for F/FJ 403.604.805.1006, cover plus 9 pages, printed in Japan, no date indicated.

Parker Motion & Control, 1996/1997 *Compumotor catalog*, pp. A1, A9, A10 and A11 concerning "Linear Stepper Motors".

Anorad Anoline Series, product brochure (31 pages plus three product specification sheets) 1993 copyright notice.

Electronic Edge Center & Height Gages, p. 1561, unknown product brochure with Edge Finder discussion.

Thomas Register 1995, "Linear Motor Components," p. 18439/LIN.

Tooling & Production magazine, "Meeting the need for Speed," pp. 51–52 and 54, Jun. 1996.

*Manufacturing Engineering*, "The War Against Thermal Expansion," pp. 45–46 and 48–50, Jun. 1996.

Anorad, "Excellence In Motion," product brochure 1995/1996 edition, pp. 1–21.

*Primary Examiner*—Timothy V. Eley
*Assistant Examiner*—Derris H. Banks
*Attorney, Agent, or Firm*—Beveridge, DeGrandi, Weilacher & Young, LLP

[57] ABSTRACT

A fluid jet cutting system that includes an X-Y axis support table that is adjustable in both the X and Y-axis direction and has frame structures that overhang a centralized support platform assembly. The frame structures include overlapping central openings positioned above an opening defined by the platform assembly. A driving system such as a linear motor system shifts the support table. A Z-axis holder is provided for supporting a nozzle head assembly in a central area of the opening defined by the platform assembly. The nozzle head assembly has a main body that is fixed in position or limited to Z-axis movement with or without fourth and fifth axis rotation capability. Workpieces are supported by rails or the like within the open area. The nozzle head assembly directly receives abrasive through a plurality of abrasive ports which directly receive branch tubes of a multi-branch abrasive feed assembly. The fluid jet energy is conserved by the abrasive flow arrangement, the avoidance of lengthy tubing, the providing of uninterrupted high pressure fluid conduits, and a gas forced abrasive particle stream when particles are utilized. The avoidance of having the nozzle head assembly shift along an X-Y plane allows for a stationary catcher tank which can be rolled into and out of position on a roller carriage. The system further includes a filter which is internally positioned within an attenuator and bellville seal/return members provided in respective chambers of a dual action intensifier.

32 Claims, 18 Drawing Sheets

U.S. PATENT DOCUMENTS

| | | |
|---|---|---|
| 4,555,872 | 12/1985 | Yie . |
| 4,669,229 | 6/1987 | Ehlbeck . |
| 4,728,379 | 3/1988 | Audi et al. ............... 451/177 |
| 4,738,174 | 4/1988 | Bloomquist ............... 83/177 |
| 4,768,709 | 9/1988 | Yie ............... 451/102 |
| 4,799,415 | 1/1989 | Gerdes . |
| 4,836,455 | 6/1989 | Munoz . |
| 4,864,780 | 9/1989 | Ehlbeck et al. . |
| 4,920,841 | 5/1990 | Johnson . |
| 4,937,985 | 7/1990 | Boers et al. . |
| 4,945,688 | 8/1990 | Yie ............... 451/102 |
| 4,949,610 | 8/1990 | Jones et al. . |
| 4,951,429 | 8/1990 | Hashish et al. ............... 451/102 |
| 4,988,485 | 1/1991 | Bene ............... 239/430 |
| 5,003,729 | 4/1991 | Sherby . |
| 5,018,317 | 5/1991 | Kiyoshige et al. . |
| 5,018,670 | 5/1991 | Chalmers ............... 239/433 |
| 5,139,202 | 8/1992 | Munoz et al. . |
| 5,144,766 | 9/1992 | Hashish et al. ............... 451/102 |
| 5,232,155 | 8/1993 | Chen . |
| 5,320,289 | 6/1994 | Hashish et al. ............... 451/102 |
| 5,322,222 | 6/1994 | Lott ............... 239/430 |
| 5,367,929 | 11/1994 | Burch et al. ............... 83/177 |
| 5,423,713 | 6/1995 | Mishima ............... 451/38 |
| 5,456,629 | 10/1995 | Bingham ............... 451/102 |
| 5,472,367 | 12/1995 | Slocum et al. ............... 451/5 |
| 5,605,492 | 2/1997 | Klingel ............... 451/102 |
| 5,643,058 | 7/1997 | Erichsen et al. ............... 451/102 |
| 5,676,589 | 10/1997 | Ashworth ............... 451/102 |

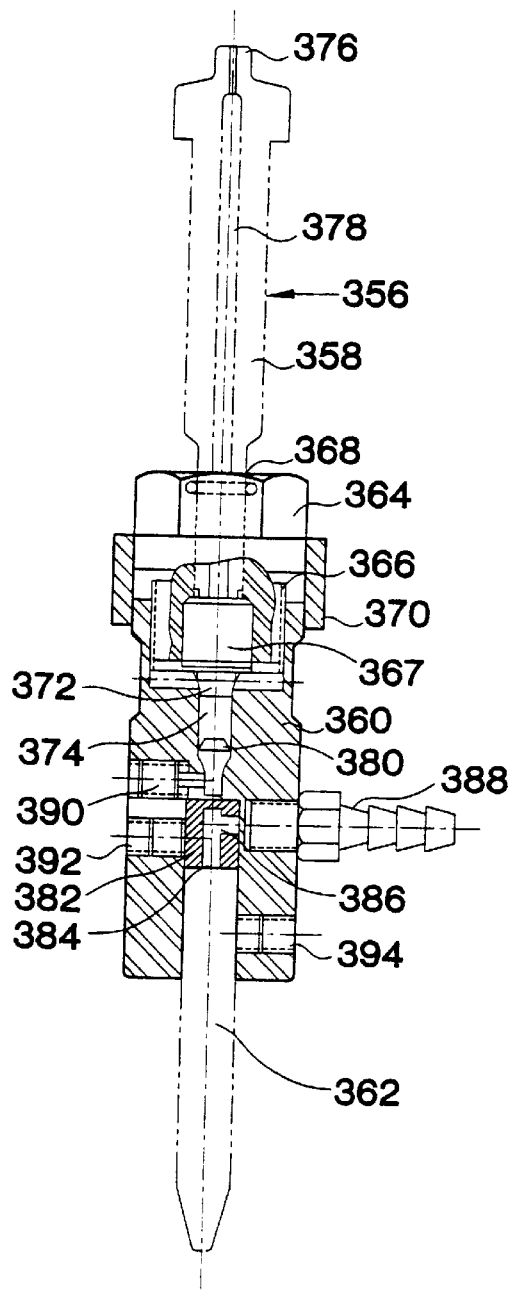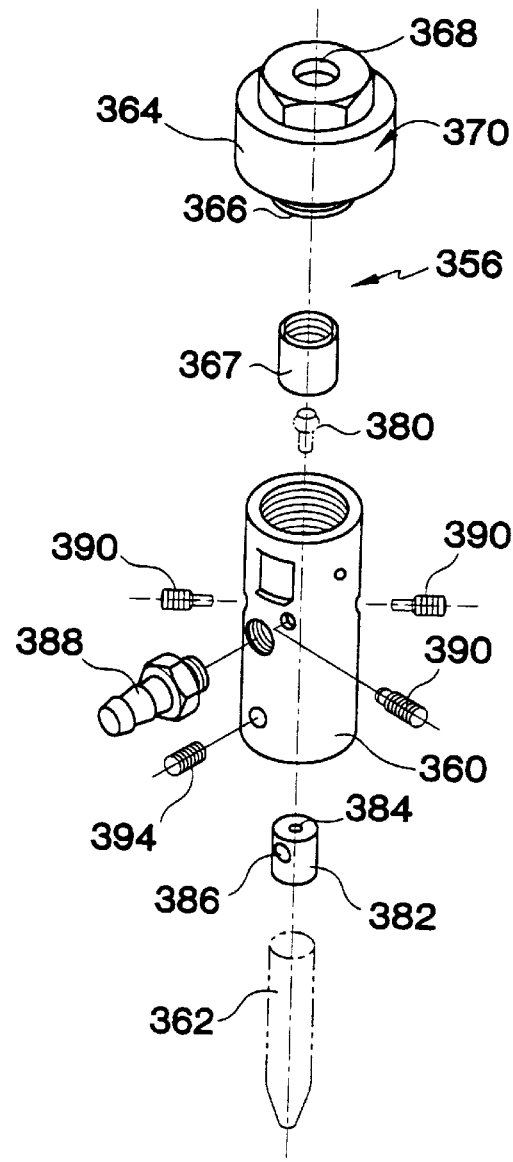
FIG. 10
PRIOR ART
FIG. 11
PRIOR ART

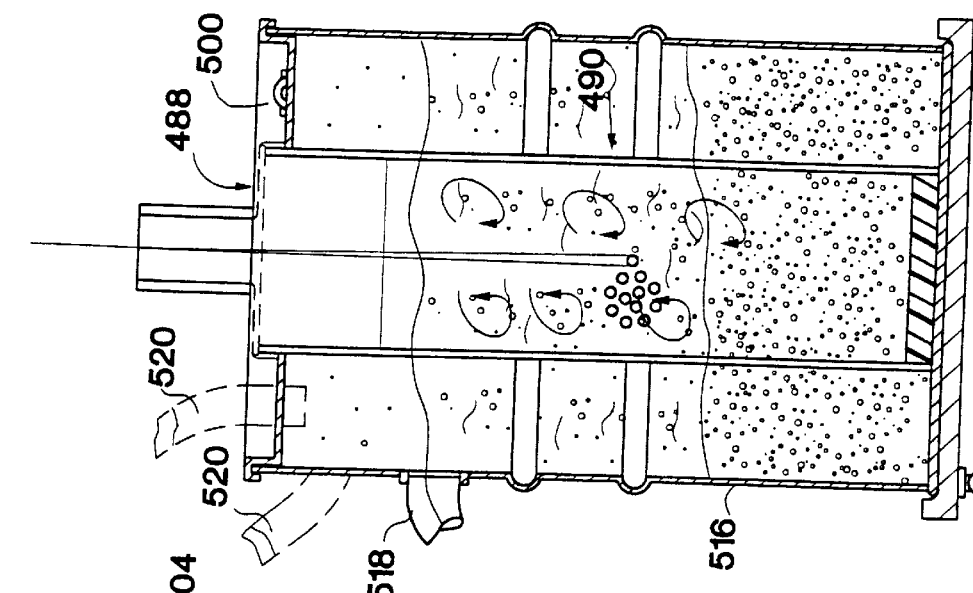
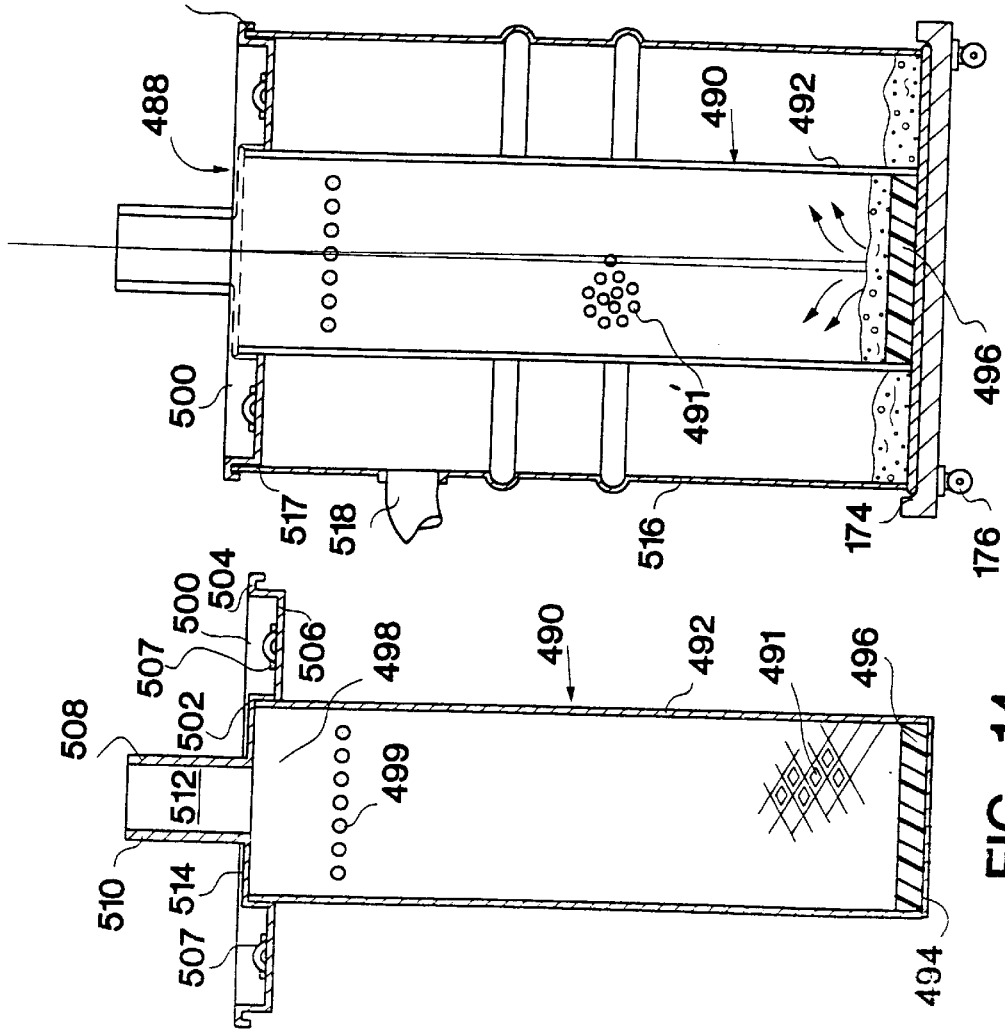
FIG. 16
FIG. 15
FIG. 14

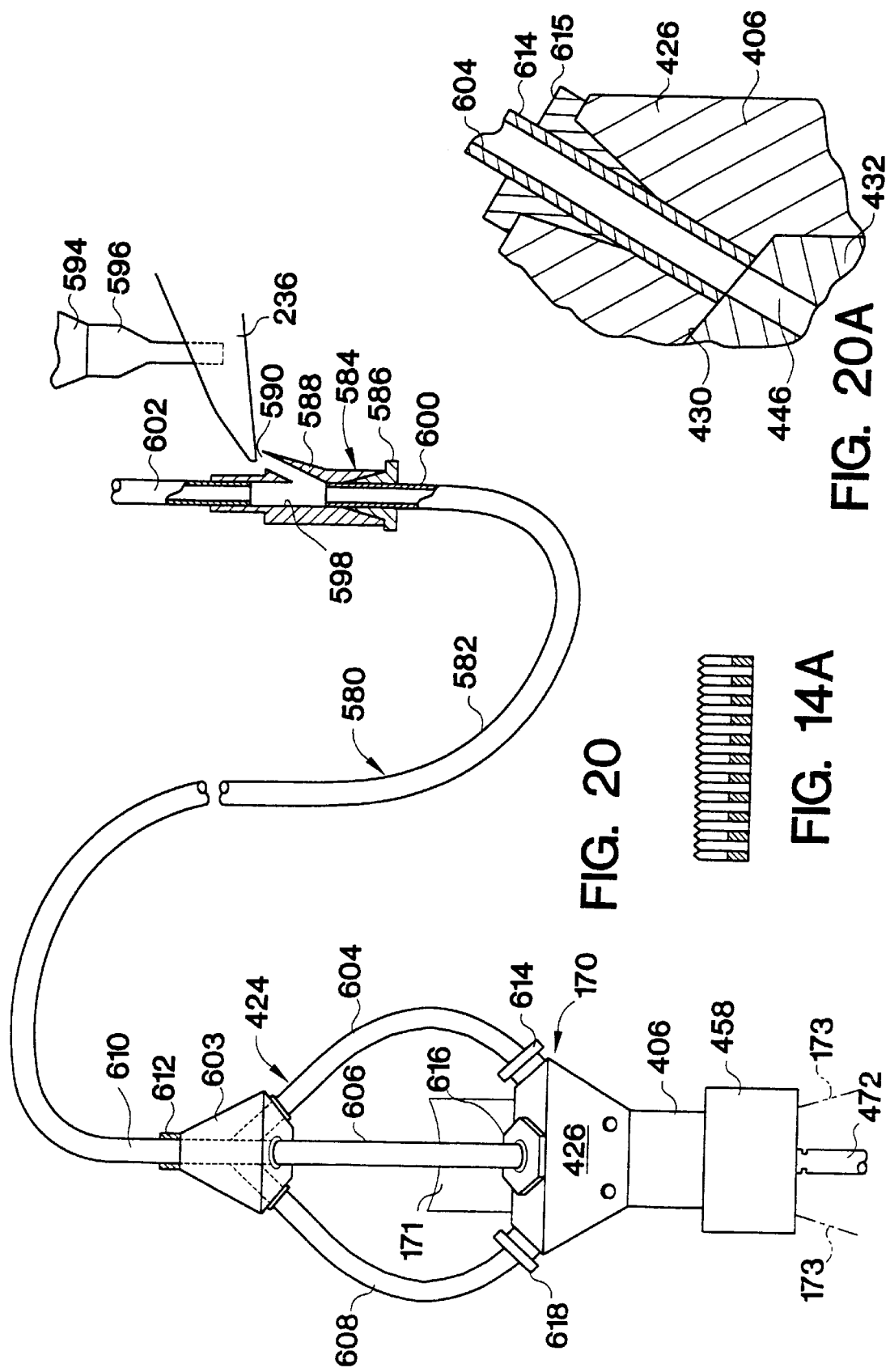

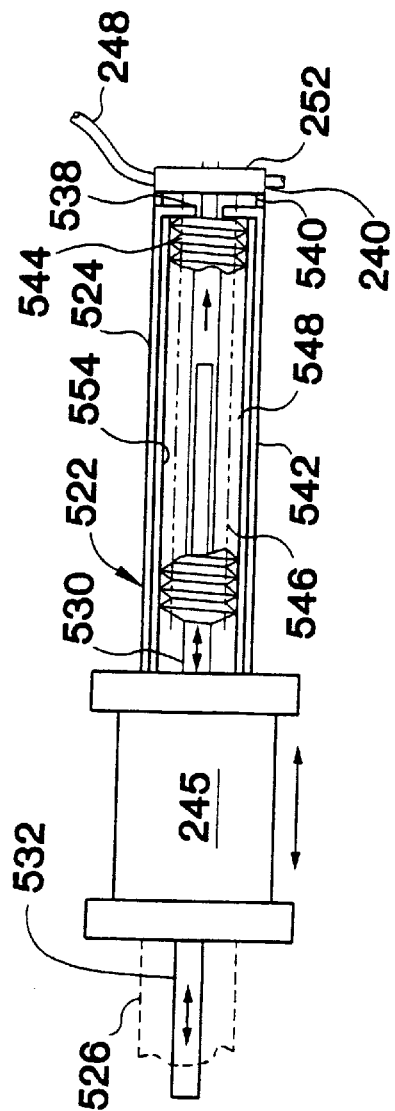
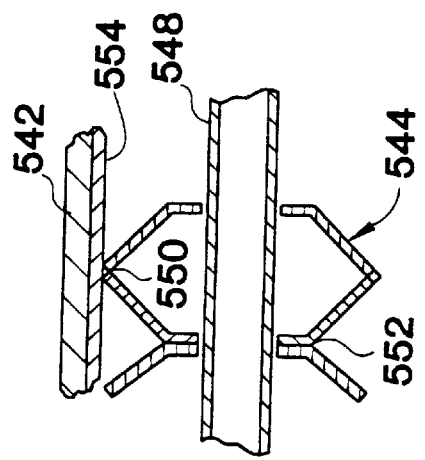
FIG. 17
FIG. 18

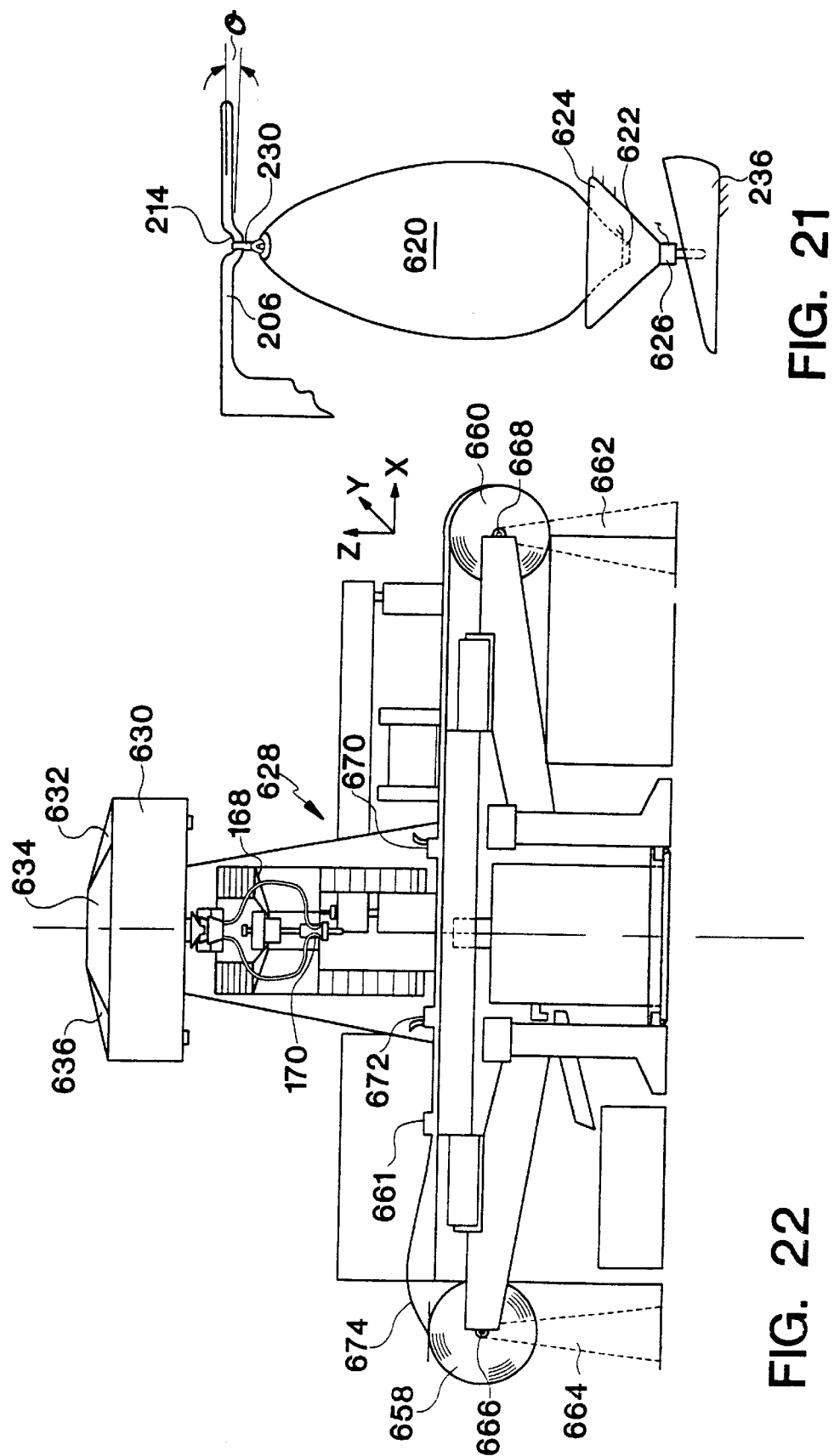

“5,908,349”

FLUID JET CUTTING AND SHAPING SYSTEM

This is a divisional of application Ser. No. 08/703,462 filed on Aug. 27, 1996, now U.S. Pat. No. 5,782,673.

FIELD OF THE INVENTION

The present application is directed at a fluid jet cutting and shaping assembly, particularly a water/abrasive fluid jet cutting and shaping assembly.

BACKGROUND OF THE INVENTION

Machines for producing high pressure, small diameter fluid jets containing abrasive materials are used to cut materials such as metals, ceramics and concrete. For some lower strength materials, such as soft foam or food, the fluid jet alone is sufficient to do the cutting. The machines are commonly referred to in the art as water jet or fluid jet cutting machines and typically feature cutting heads that are connected to high pressure water pumping systems to establish an ultra-high pressure water jet. The standard in the industry is to have a cutting head that is moved relative to a workpiece to produce the desired cuts in the workpiece. The fluid jet, following passage past the workpiece, and the particulate material of the cut workpiece are collected below the workpiece for appropriate disposal. Often a large tank is placed below the workpiece to achieve the collection of the liquid and particulates or, in some machines, a smaller collector that moves with the above positioned nozzle head is relied upon.

FIG. 1 shows an example of a typical prior art waterjet cutting machine which uses the benefit of added abrasive for increased cutting ability. In FIG. 1 there is shown abrasive liquid jet cutting system 10 which uses water and abrasive for cutting. Workpiece 11 is a stationary plate typically of rigid and/or semi-rigid material, such as plastic, metal, ceramic, concrete, composite materials and the like. Work table 12 is a generally rectangular frame that supports workpiece 11 such that the workpiece stays in position as the cutting head carries out a preprogrammed pattern. Table 12 has a hole in it which is under the workpiece and is dimensioned to correspond with the particular product being formed or can be replaced with a disposable grating for a greater latitude of possible product size formation.

The prior art abrasive liquid jet system 10 in FIG. 1 has an intensifier, indicated generally at 13, operable to provide a continuous supply of water under ultra high pressure to a cutting head indicated generally at 14. Ultra high pressure water is under pressure of at least 30,000 psi. The water pressure developed by intensifier 13 is typically in the range of 30,000 to over 100,000 psi. Cutting head 14 accommodates a supply of grit or abrasive materials introduced to cutting head 14 through side tube 16. A continuous supply of grit is directed into tube 16 from a grit source such as hopper 38 and associated supply tube 39. The grit is entrained within the high velocity jet 17 of water that is discharged through an elongated tubular nozzle 36 at the lower end of cutting head 14. Nozzle 36 projects downward toward the top of workpiece 11.

An X-Y drive control assembly 18 which is programmed by a computer (not shown) controls the movement of cutting head 14 relative to workpiece 11 to provide a selected cut in workpiece 11 to make a product.

As also shown in FIG. 1, the high velocity liquid jet 17 containing the abrasive material cuts through workpiece 11. The water, abrasive material and particulate materials of workpiece 11 are then directed downwardly into a catcher or receiver indicated generally at 19. Receiver 19 collects the water, grit and particulate materials of workpiece 11 and discharges these materials into a settling tank or some other means of disposal.

Intensifier 13 has a piston and cylinder assembly, forming hydraulic motor 21, that sequentially operates piston pumps 22 and 23 to elevate the pressure of the water to the ultra high pressure range. Hydraulic motor 21 is operated in response to hydraulic fluid under pressure derived from a pump 26 driven by a motor 27. The hydraulic fluid is withdrawn by operation of pump 26 from a reservoir 28 and discharged into a solenoid operated reversing valve 30 operable to selectively supply hydraulic fluid under pressure to opposite ends of hydraulic motor 21 and return fluid back to reservoir 28. The ultra high pressure water flows from pumps 22 and 23 through check valves 29 and 31 into attenuator 32 which provides for a constant flow rate of water to cutting head 14. The ultra high pressure water is delivered to a linear chamber 34 of a generally upright body 33 of cutting head 14. The water flows through a small opening in a sapphire, ruby, diamond or corundum element (not shown in FIG. 1) located adjacent the upper end of nozzle 36. Grit is introduced into the stream of water flowing between the sapphire element and the upper end of nozzle 36. A mixture of grit and water flows through nozzle 36 and is discharged therefrom as a high velocity small diameter waterjet 17.

FIG. 2 also shows a conventional, prior art waterjet cutting machine which has features similar to those schematically shown in FIG. 1. FIG. 2 shows in greater detail the movement means 40 provided for the X-Y movement of head assembly 42 (with cutting nozzle). Movement means 40 provides both support and movement in head assembly 42 as it features gantry crane system 43 with adjustable X-axis beams 44, 46 supported at their ends by corner support structures 48, 50, 52 and 54 and crossbeams 56, 58. This overhanging arrangement, in combination with the suspended head assembly, leads to a degree of inertial head assembly shaking if the head assembly is accelerated or deaccelerated too fast or if there is a rapid shift in direction. This shaking leads to inaccuracies in cutting and requires the operator to ramp up or down the speed during initial start up and stopping and to avoid rapid turns.

Positioned below head assembly 42 is tank frame 60 which provides strength to catch tank 62 having a sloped bottom. A drag chain (not shown) or the like is used to periodically purge the large tank of grit and product water. Frame 60 provides support to a large grate 61 of relatively inexpensive material which is cut together with the workpiece and periodically replaced.

FIG. 2 further shows control stand 64 which provides for programming or the like and which communicates with controller 65 supported on support 52 through which all the moving components in the system can be controlled. This includes the peripherally positioned intensifier 66 which is connected via high pressure piping system 67 to intermediate water reception area 68 with gauge and filter assembly and from which extends high pressure water tube assembly 70 with its in-line swivel elbows to accommodate for nozzle head shifting. Tube 70 is connected to head assembly 42.

Additional peripheral members include hopper 72, which is connected, via tube 74 (partially shown), to head assembly 42, and settlement tank 76 (the latter shown unconnected but would be in communication with tank 62). Hopper 72 is pressurized (e.g. a diaphragm arrangement) to force abrasive out of the hopper and to the nozzle head. Although not shown, additional peripheral items available in the prior art include chillers (for the hydraulic pump) and reverse osmosis water purifiers positioned upstream of the intensifier.

The prior art system illustrated in FIG. 2, with its X-Y plane adjustable head assembly occupies a relatively large space (e.g., length L1 of approx. 100" along X-axis, a Y-axis length L2 width of 60" length and a Z-axis height L3 of about 93"). Moreover, the large tank required to cover the possible X-Y movement of head assembly 42 occupies a large percentage (e.g., 80%) of the X-Y axis area (L1×L2) and peripheral components (some of which are not shown) are spaced outside of the tank's periphery so as to increase floor space usage, still further. For example, rather than repeatedly having to shut down the system to clean out catch tank 62 conventional systems often employ an automated scraper or drag chain assembly for abrasive removal. The scraper chain assembly takes up another three feet or so further out from catch tank 62. Because of this large floor space usage many job shops or the like are unable to utilize such prior art fluid jet systems because of the unavailability of that much space and/or the cost for such space usage.

Due to the multitude of peripheral components associated with the conventional systems, each component requires an individual containment enclosure or is left open. For example, the larger conventional systems such as that shown in FIG. 2 feature an open gantry frame arrangement with this openness resulting in a large deal of waste and debris being splattered or strewn about the system, making for a messy work environment.

Also, the high pressure piping line, which includes piping system 67 originating at intensifier 66 and tube assembly 70 which, ends at the nozzle head assembly 42, and which also includes intermediately positioned filter 68 and swivel elbows, etc., typically runs about 50 feet or so. This length of tubing and the myriad of changes in flow direction leads to losses in energy which otherwise could be used to enhance the speed and capability of the cutting fluid jet.

Additional problems associated with such prior art systems include the relatively high cost for an entire system, lack of flexibility for handling different shaped objects to be cut, difficulty in switching over from one cutting abrasive to the next or resupplying an emptied container, cutting accuracy difficulties (especially with temperature expansion and contraction of the gantry frame), loads on floor space, difficulties in maintenance and repairs, tooling inflexibility etc.

SUMMARY OF THE INVENTION

As will be made clearer below, the present invention is directed at providing solutions to the aforementioned problems associated with the prior art. In so doing, the present invention features a fluid jet cutting system, comprising a high pressure fluid supply assembly, a nozzle head assembly, a high pressure fluid line extending between the high pressure fluid supply assembly and nozzle head assembly for supplying the nozzle head assembly with high pressure fluid from the high pressure fluid supply assembly. In addition, the invention features an X-Y axis support table assembly which includes an open area, and the X-Y axis support table is designed for supporting a workpiece within the open area. Means for shifting the X-Y axis support table both in an X-axis direction and a Y-axis direction is provided such that a workpiece supported by the support table is positionable to a variety of locations along an X-Y axis plane with respect to the nozzle.

The nozzle head assembly is supported by a Z-axis support assembly over the open area in the support table, and the nozzle head assembly includes a main body which is precluded from movement with respect to the X-Y axis plane. The X-Y axis support table assembly preferably features a Y-axis frame structure having an open section formed therein and an X-axis frame structure having an open section formed therein.

The invention also features means for shifting the nozzle head assembly along a Z-axis toward and away from the X-Y axis support table, and the nozzle head assembly can be designed to be adjustable along a fourth and fifth axis such that-the nozzle forms an acute angle with respect to the Z-axis extending vertically below the nozzle.

In a preferred embodiment, the X-Y axis support table includes a pair of centrally positioned Y-axis platforms rigidly secured to an underlying surface and spaced apart along the X-axis and extending in a Y-axis direction, and the Y-axis frame structure has a pair of sliding contact surfaces which slide along the Y-axis platforms in the Y-axis direction. Also, the X-axis frame structure has a pair of sliding contact surfaces which slide along, in the X-axis direction, a supporting pair of support surfaces provided on the Y-axis frame structure.

The means for shifting the X-Y axis support table preferably includes a linear motor system. The means for shifting can include a first linear motor assembly with the Y-axis platforms each supporting a component of the first linear motor assembly, and the means for shifting further includes a second linear motor assembly which is supported on the Y-axis frame structure and drives the X-axis frame structure in an X-axis direction.

The fluid jet cutting system of the present invention further comprises a catch tank assembly positioned below the nozzle head assembly and which remains stationary during operation of the nozzle head assembly and movement of the X-Y axis support table. The catch tank assembly preferably includes a roller carriage assembly which is dimensioned and arranged such that the catch tank is rollable into and out of operating position below the nozzle head assembly. A positioning bar can also be provided for proper location and confinement of the catch tank.

In a preferred embodiment the catch tank assembly includes a drum and an energy dissipation insert centrally positioned within the drum the energy dissipation insert has a plurality of perforations positioned peripherally in an upper region of the drum through which fluid can exit into a settling region formed between an interior surface of the drum and an exterior surface of the insert. Alternatively, the energy dissipation insert can have a mesh wall which has a mesh size dimensioned to trap a predetermined size of non-fluid material in the fluid stream.

The fluid jet cutting system further preferably comprises a Z-axis support assembly extending between and fixed to the Y-axis platforms, and the Z-axis support assembly includes a rigid cantilever extension having a free end to which the nozzle head assembly is secured. Also, the high pressure fluid supply system comprises an intensifier and an attenuator with the intensifier feeding high pressure fluid to the attenuator, and the high pressure fluid supply assembly including a high pressure fluid line extending between the attenuator and the nozzle head assembly which is elbow free and of a length less than 100 inches (254 cm). An abrasive feed assembly which has an abrasive supply source and is positioned at least partially below the X-Y axis support table when the support table is in an extended state is also provided. Other components can also be positioned at least partially under the area covered by the X-Y axis support table such as a settling tank, hydraulic pump, water pump, etc. so long as their height is less than that of the Y-axis platforms.

The fluid jet cutting system also preferably comprises a multiple source abrasive feed assembly and an abrasive feed conduit extending between the multiple source abrasive feed assembly and the nozzle head assembly. The multiple source abrasive feed assembly can include a plurality of supply bags each supported on a downwardly sloping support bar with a notched reception area. In an alternate embodiment, one or more supply bins can be utilized which are preferably at least partially positioned under the maximum X-Y periphery capable of being assumed by the X-Y axis support table. The multiple source abrasive feed assembly can, alternatively, be a carousel supported on a platform above the nozzle head assembly with the carousel being rotatable to position different abrasive feed bays in communication with the nozzle head assembly.

The fluid jet cutting system also preferably further comprises one or more workpiece support rails extending across the open area and supported by the X-Y axis support table so as to be moveable in combination therewith when secured thereto and easily shifted and fixed in a desired location between operations. Each support rail also preferably has an adjustable clamp workpiece supporting member. The clamp's (or clamps') function is to hold the scrap and workpiece material after the workpiece is cut from the material (e.g. clamps on spaced apart support rails to hold respective work and scrap pieces of a cut in half workpiece).

The aforementioned catch tank is positioned below the nozzle head assembly and the shifting of the open areas in the X-Y axis support table by the means for shifting defines a fluid jet cutting range, and an area defined by the fluid jet cutting range is larger than a fluid jet reception opening in the catch tank (e.g., the cutting area being at least 30% larger than the reception opening and over 100% larger when a reception lid is placed over the catcher tank).

The abrasive feed assembly of the present invention preferably includes an abrasive supply source and an abrasive feed system for feeding abrasive from the supply source to the nozzle head assembly. The abrasive feed system includes a main conduit which is in communication with a downstream multi-port feed assembly having at least three branch ports. The branch ports have ends which open into a plurality of abrasive feed ports circumferentially arranged about a main housing of the nozzle head assembly.

The abrasive feed system further comprises a split branch reception member having an abrasive feed conduit for receipt of abrasive from the feed source, a gas reception conduit, and an outlet in communication with the main conduit. The abrasive feed system further comprises a gas source in communication with the gas reception opening which helps reduce the discrepancy between the fluid velocity and inlet abrasive feed velocity in the nozzle head so as to increase energy efficiency in the resultant combination stream. The gas also helps to facilitate transportation of abrasive material to the nozzle head assembly.

The high pressure fluid supply assembly of the present invention includes an intensifier which includes dual fluid reception chambers, means for shifting the fluid reception chambers from a low pressure fluid reception mode to a high pressure fluid release mode, and a pressurizing assembly for pressurizing fluid received within the chambers. The pressurizing assembly includes a bellows member and a reciprocating shaft in contact with the bellows member whereby the bellows member seals the fluid within the reception conduit from an area external to the bellows. This avoids the intermingling of contaminants from the rest of the intensifier, such as grease, broken off seal components, etc., with the fluid being fed to the nozzle head.

The bellows members are each comprised of a plurality of bellville washer shaped members joined in mirror image fashion along contacting interior rims and contacting exterior rims. Each bellows member preferably includes a block fixed at one of its end with the block having a hole for releasable securement with the reciprocating shaft of the intensifier. The opposite end of the bellows member is secured, in a sealing fashion, to the inside of one of the intensifier's pressure chambers and is open for receiving fluid therein. One purpose for the prior art's use of a water purifier, such as a reverse osmosis water purifier, is to avoid having certain materials come into contact with the sensitive seals of the intensifier (e.g. the removal of chlorine and dirt particles from the public water source). The bellows members of the present invention eliminates the water seals of the intensifier and thus provide a system which can function well without the requirement of a reverse osmosis water purifier which purifier often costs in excess of $10,000. In fact, a much less expensive filter such as the prior art filter often found downstream of the intensifier and used mainly for a final trapping of contaminants such as grease and seal pieces before reaching the nozzle head, can be used upstream of the intensifier rather than a reverse osmosis purifier. The high pressure fluid supply assembly of the present invention also includes a filter supported internally within the attenuator.

This filter positioning helps provide for a shorter, more efficient high pressure supply line.

In one embodiment of the invention the fluid jet cutting system features workpiece sheet supply means, and a sheet feeder device secured to the X-Y axis support table assembly and positioned for receiving workpiece sheeting from the supply means. The system further comprises a die plate supported on the X-Y axis support table which is moveable together therewith. The die plate has two distinct cutting patterns formed therein positioned downstream of the sheet feeder.

The present invention also features a method for cutting a workpiece with a fluid jet that comprises feeding a high pressure fluid from a fluid supply assembly to a nozzle head assembly, which nozzle head assembly is limited to movement along a Z-axis coinciding with a central axis of a nozzle of the nozzle head assembly; fixing a workpiece on to an X-Y axis support table such that the workpiece is positioned within an open area formed in the X-Y axis support table; and shifting the X-Y axis support table and supported workpiece in both an X-axis and a Y-axis direction with respect to the nozzle head assembly positioned above such that the workpiece is subjected to a high pressure fluid jet emanating from the nozzle head assembly.

The method also preferably involves feeding abrasive to a central fluid passageway in the nozzle head assembly through a plurality of abrasive ports each extending from an exterior surface of the main housing and directing the abrasive downward along a direction which forms an acute angle with the central axis of the fluid conduit formed in the main housing The present invention also features a uniquely designed nozzle head assembly, comprising a main body having a centralized fluid passageway and at least three abrasive ports formed therein. The abrasive ports are circumferentially spaced about the main body and each of the ports both independently open into the fluid passageway and out at an exterior surface of the main body. The ports each have a central axis which forms an acute angle with a central axis of the centralized fluid passageway. The nozzle head assembly also includes a nozzle conduit extending out away from the main body and aligned with the centralized fluid passageway.

The nozzle head assembly further comprises a fitting for joining a high pressure fluid conduit to the main body such that high pressure fluid is directed through the centralized fluid passageway, an orifice assembly positioned within the centralized fluid passageway for accelerating high pressure fluid passing therethrough, and a wear insert positioned within a hollow formed in the main body and below the orifice assembly. The wear insert has a central throughhole in fluid communication with the centralized fluid passageway and a plurality of abrasive conduits. The abrasive conduits are in communication with the abrasive ports, essentially share a common central axis with that of the abrasive ports, and open into the central throughhole.

The nozzle head assembly also features abrasive feed tubes which are received within respective abrasive ports and extend inwardly into the main housing. The abrasive feed tubes extend inwardly until coming in contact or essentially in contact with a rim in the wear insert defining the outer end of an abrasive conduit such that abrasive particles can be passed through the main housing without coming in contact with the main housing.

A tube fixing means can be provided for fixing the abrasive tubes in position with respect to the main body. The tube fixing means includes a tapered nut for clamping the abrasive tubes in position which tube is threadably received by a threaded reception area supported by the main body.

The threaded reception areas are defined by a threaded portion of an outward end of each of the abrasive ports, and the tapered nut is formed of a plastic material.

The nozzle head assembly further comprises a collet member having a hole formed therein through which the nozzle conduit extends and the main body includes a correspondingly shaped reception cavity for receiving the collet. The nozzle head assembly also comprises a lock member releasably joined with the main body and for varying the degree of compression forces acting on the exterior of the collet, and the nozzle conduit being releasably fixed within the hole formed in the collet. The lock member is a preferably cup-shaped member which is threadably, adjustably secured to the main body and has an internal, bottom surface for contacting with a bottom surface of the collet, and a top surface of the collet is positioned for preventing escape of the wear insert.

The nozzle head assembly of the present invention further comprises an elastomeric or compressible member that is positioned between the surface of the collet and the wear insert and is in contact with each so as to bias the wear insert into a desired position. A lesser height protective metal flange ring or the like can be provided inward by the elastomeric flange for added protection.

The nozzle head assembly further features an acute angle in its abrasive ports ranging from 15 to 25° and there are at least three or four of the abrasive ports equally spaced about the main body. The nozzle head assembly further comprises a disc shaped splash guard extending about the nozzle and supported by the main body. In addition, edge (or position) detectors, which are circumferentially spaced around the nozzle conduit, can be provided.

As the collet member has a frusto conical shape and a central hole through which the nozzle conduit extends a cup shaped locking member for locating the collet can be placed in position with respect to the main body. An edge detector, which has a diameter corresponding to that of the nozzle conduit for reception by the collet once the nozzle conduit is temporarily removed, is also provided.

The nozzle conduit can also have a weakened ring area which is of a lesser impact strength than a remainder of an exposed portion of the nozzle conduit so as to avoid extensive damage to the nozzle head and contacted object upon inadvertent contact.

BRIEF DESCRIPTION OF THE PREFERRED EMBODIMENTS OF THE INVENTION

The advantageous aspects of the invention will be more fully appreciated from the following description, particularly when considered in conjunction with the attached drawings, wherein:

FIG. 10 shows a cross-sectional view of a prior art nozzle head assembly;

FIG. 11 shows an expanded view of the prior art nozzle head assembly shown in FIG. 10;

FIG. 14 shows a cross-sectional view of an energy dissipation insert of the present invention;

FIG. 14A shows an alternate embodiment of deflector for the insert;

FIG. 15 shows a cross-sectional view of the insert of FIG. 14 in position within a drum during start-up of a waterjet cutting process;

FIG. 16 shows a view similar to FIG. 15 but following a plurality of waterjet cutting runs and also with an added optional vacuum system illustrated;

FIG. 17 shows in cross-section and in cut-away fashion a preferred intensifier pump of the present invention;

FIG. 18 shows a close up view of the connection of components of bellows in FIG. 17;

FIG. 20 shows an abrasive feed assembly of the present invention;

FIG. 20A shows an expanded view of a cut-away feeding insert in FIG. 20;

FIG. 21 shows an abrasive supply bag assembly of the present invention;

FIG. 22 shows an alternate embodiment of a fluid jet cutting assembly of the present invention;

DETAILED DESCRIPTION OF THE PREFERRED EMBODIMENTS

Figure 3:
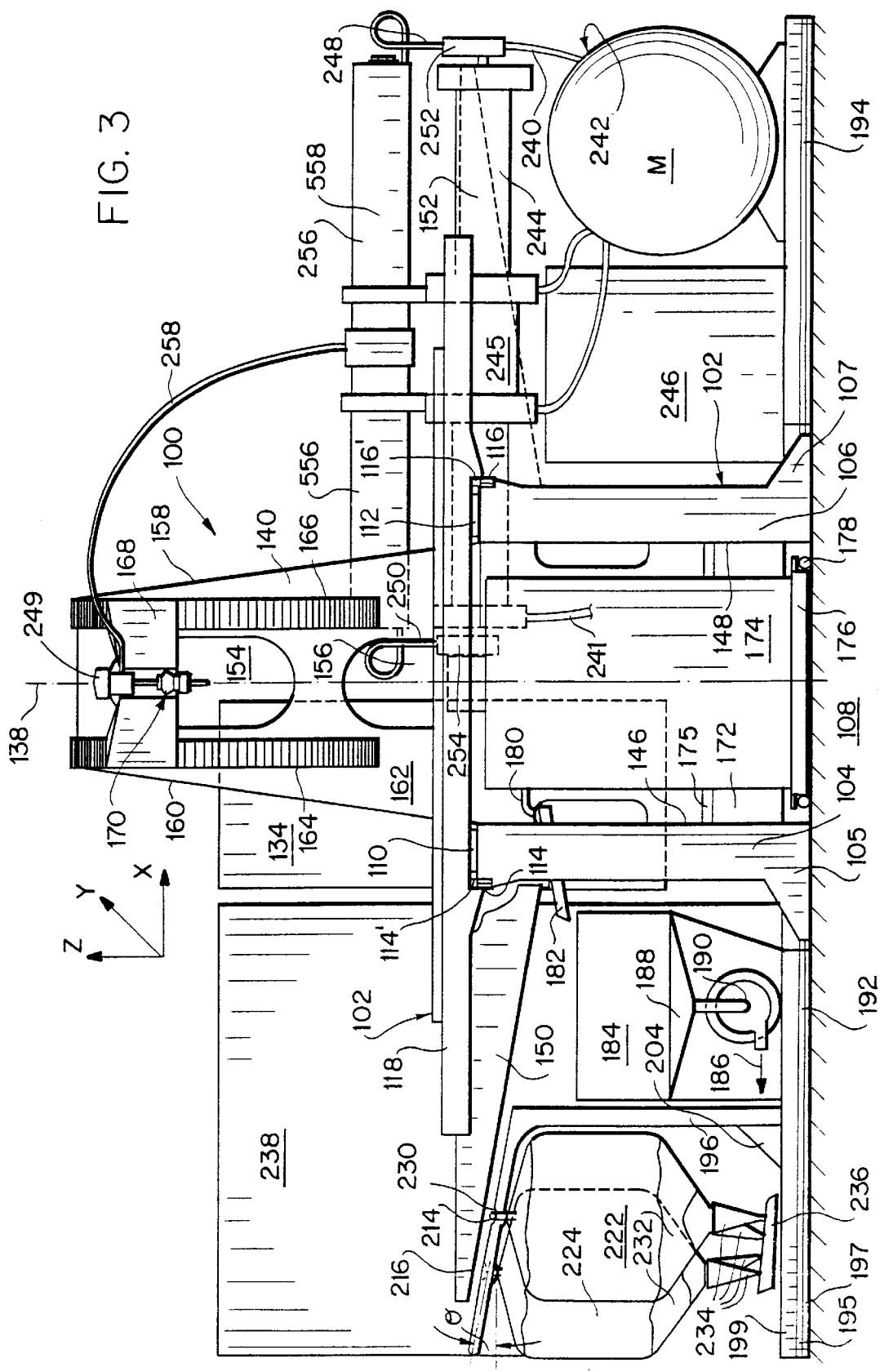
FIG. 3 shows a front elevational view of a fluid jet system of the present invention.
Figure 4:
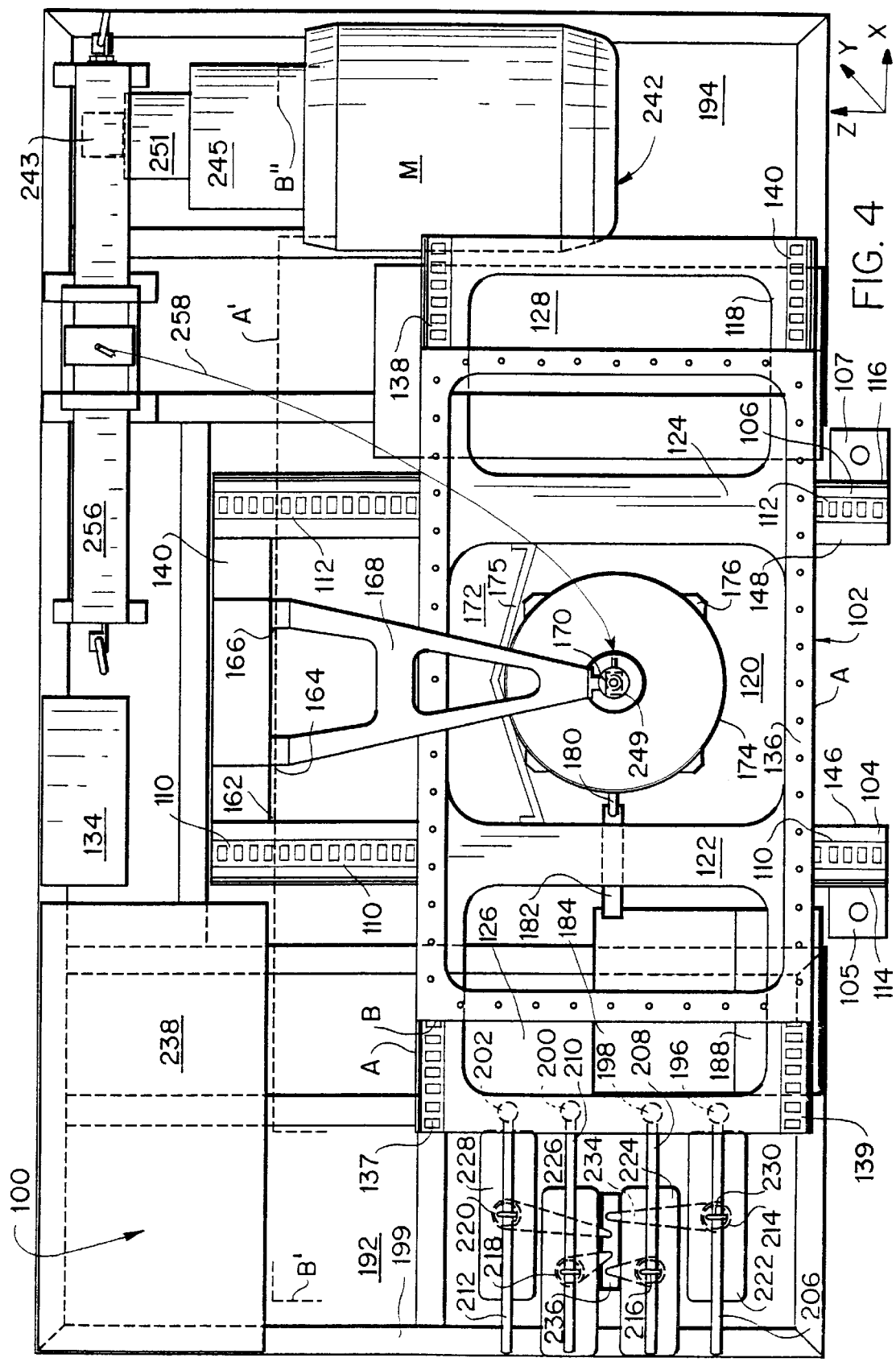
FIG. 4 shows a top plan view of that which is shown in FIG. 3.
Figure 5:
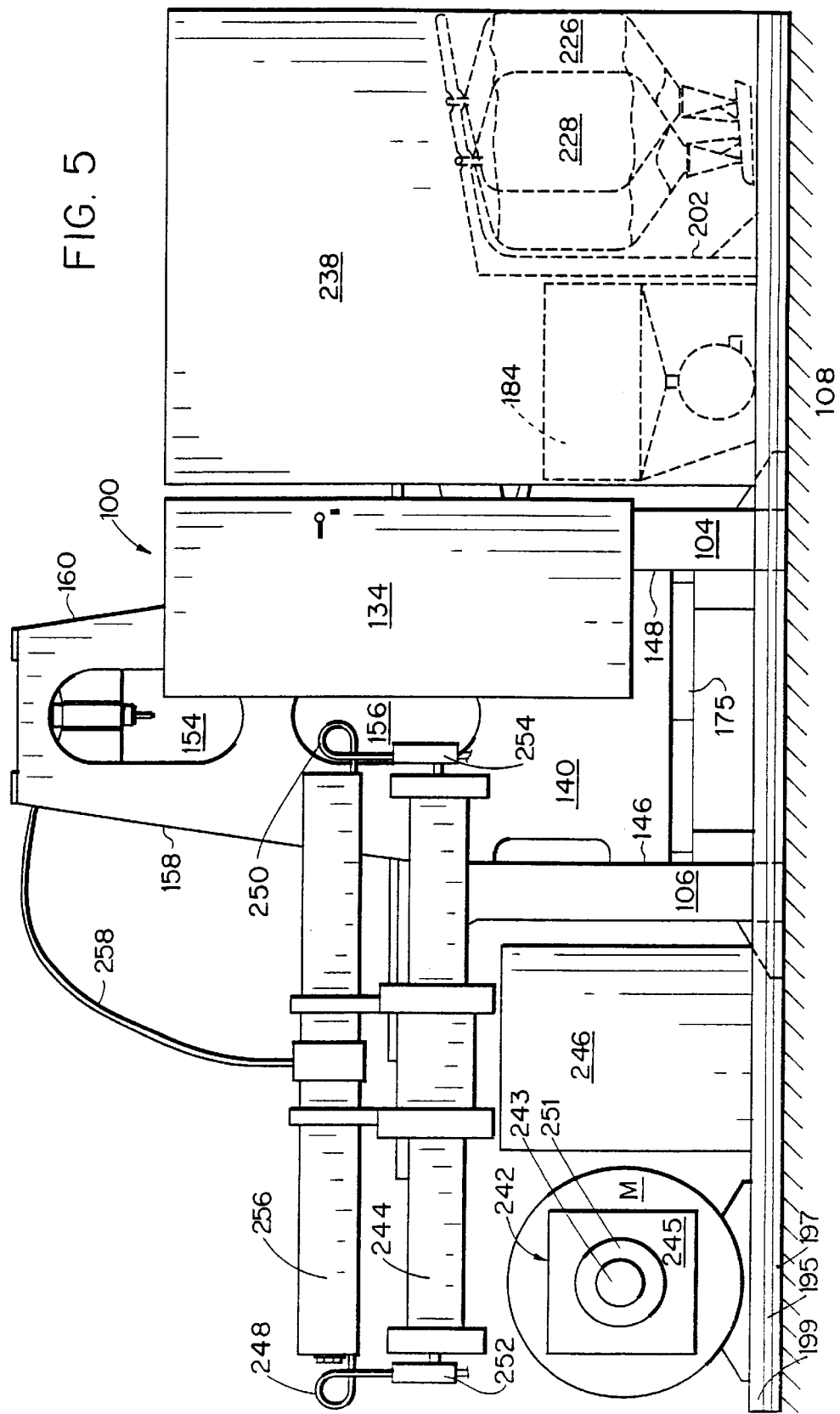
FIG. 5 shows a rear elevational view of that which is shown in FIG. 3.

FIGS. 3–5 show a preferred embodiment of the fluid jet system 100 of the present invention. As shown in FIGS. 3–5, the present invention features X-Y support table assembly 102 which includes first Y-axis platform 104 and second Y-axis platform 106 each rigidly secured to underlying surface 108 by way of bolts or the like extending through holes formed in feet 105 and 107 of platforms 104, 106 (see FIG. 4). Y-axis platforms 104 and 106 have an upper surface which preferably includes or supports linear motor ways 110 and 112 for a linear motor. If a linear motor system is not relied upon, then the upper surface of platforms 104 and 106 can support (or come in contact) with a bearing system such as a roller, air flotation, magnetic flotation (combinations thereof) or similar type of bearing arrangement. In combination, with the bearings or ways supported on the upper surface of platforms, optional fixed rails 114, 116, can be provided.

Slidingly supported on Y-axis platforms 104 and 106 is Y-shift frame structure 118. Y-shift frame structure 118 preferably has a rectangular configuration with a relatively large central opening 120 as shown in FIG. 4. In a preferred embodiment opening 120 has a length of 30" to 50" along the Y-axis and 25" to 45" along the X-axis, although the size of the opening and surrounding frame structure can be varied based on the anticipated uses of the system 100. Central opening 120 is bounded by frame sections 122 and 124 which, respectively, also define the inner edge of exterior openings 126 and 128 in frame structure 118. Frame sections 122 and 124 are spaced apart along the X-axis to an equal degree as Y-axis platforms 104 and 106. Thus, frame sections 122 and 124 are in aligned, sliding engagement with platforms 104 and 106 and can have lower surfaces which support the riding component of the aforementioned linear motor or support roller bearings or present roller bearing contact surfaces As shown particularly in FIG. 4, Y-axis platforms 104 and 106 extend along the Y-axis for a greater distance than the Y-axis length of frame sections 122 and 124. Accordingly, Y shift frame structure 118 is free to slide along the Y-axis between an intermediate position A shown in solid lines in FIG. 4 to a first extended position A' shown by dash lines in FIG. 4. A similar extension in the opposite direction from intermediate location A is also available whereupon a portion of platform 118 extends off from the end of platforms 104 and 106, but a majority stays on platforms 104 and 106. Various other arrangements are also possible, such as increasing the length of the platform 104, 106, shortening the cantilevered A-frame support 168, etc. Preferably, Y-axis platforms 104 and 106 are 1.5–2 times greater than the Y-axis length of frame sections 122 and 124 and, as noted, if further extension length is required (or shorter length platforms), the frame structure 118 is free to shift to some extent past the Y-axis ends of platforms 104 and 106 into an overhang arrangement. In this way, the Y-axis length of the possible cutting distance is equal to the Y-axis distance between the opposite sides of Y-shift frame structure 118 defining opening 120. In a preferred embodiment the Y-axis length of Y-axis platforms 104 and 106 is about 80" while the Y-axis length of frame structure 118 is about 46" although these parameters can be varied in accordance with such factors as the types of product to be formed and the spacing available for a fluid jet cutting system.

Frame structure 118 (as well as the below discussed X-shift frame structure 136, supports 104, 106, support 140, A frame 168 as well as support rails 282 and 284 described below) is preferably formed of a relatively light weight material such as a high strength, composite material (e.g., a laminated prepreg assembly or a plastic material with fiber reinforcement S such as graphite or glass fibers). The Anocast division of Anorad Corporation of Hauppage, N.Y. represents one suitable source for low density polymer composites castings.

The sliding action of Y shift frame structure 118 is provided by any suitable driving means such as a pair of linear servo motors which feature permanent magnet ways (also available from Anorad Corp.) on the respective Y-axis platforms, linear stepper motors (motors that involve the supply of electric current to create the magnetic field versus a linear motor using permanent magnets in series) or any other suitable driving means. It is also preferable to utilize linear motors for shifting in the X axis direction as explained more fully below. Also, linear motors can be used on the Z-axis as well as the X and Y axes as long as precautions against motor overheating and stage falling upon a power failure are utilized such as through counterbalancing with a spring counterweight or air cylinder or the like. Other driving means that can be used include a rack and pinion or ball screw arrangement. However, due to the large open area cutting feature of the present invention, when using a mechanical system, such as ball screws, two screws are required with each placed on an opposite side of the opening. The requirement for two screws leads to increased complexity in attempting to compensate for differences between the two drives which are more prevalent in a mechanical system than in a linear motor system. (The use of a single ball screw drive at one side would lead to a twisting of the frame and thus would be undesirable.)

In view of the light weight arrangement in the frame structure 118 provided by the large openings (and composite material if utilized) frame structure 118 is well suited for shifting by way of a linear motor which provides the benefit of highly controlled and continuous knowledge of the present location, significant increases in acceleration and velocity capabilities of the frame (which is important for contour cutting as described below), provides smooth, non-contact travel and has ways that can double as guide tracks. While the linear motors 110 and 112 can be self guiding additional guiding means can be added such as riding tracks 114 and 116 positioned to the exterior sides of platforms 104 and 106 upon which grooved rollers 114', 116' (FIG. 3) or the like can run upon.

A pair of linear motors provided on the Y-axis platforms can be highly accurately controlled fairly easily due to their differences in design over other mechanical driving systems through use of a standard servo controller or the like. Linear motors 110 and 112 of the present invention are in communication with a servo control (not shown) via suitable electrical lines (not shown) with the servo control being positioned within electrical cabinet 134 as are the other electrical components of the system such as a programmer. The servo controller can be linked to a program or have its own internal programming means (not shown) for inputting control signals such as a sequence of movements of the X-Y axis table.

Y-shift frame structure 118 supports along its upper and/or side edges, X-shift frame structure 136. X-shift frame structure 136 is shown in FIG. 4 to slide along sides 138 and 140 of frame structure 118. Preferably, X-shift frame structure 136 is shifted through use of a linear motor system having ways 137 and 139 supported by (e.g., embedded in) sides 138 and 140 of frame structure 118. As with the interface between platforms 104, 106 and frame 118, additional guiding means at the interface of frame structures 118 and 136 can be provided such as a suitable bearing arrangement (e.g., air bearings and/or roller-rail assembly). In addition, like the Y-shift frame structure 118, frame structure 136, when driven by a linear motor, is connected to a servo controller (not shown) which is contained in electrical and control panel cabinet 134.

X-shift frame structure 136 features a rectangular shaped frame having internal X-axis side edges which are spaced apart along the Y-axis to an amount essentially equal to the width of the Y-axis opening 120. Further, the frame sections of frame structure 136 extending along the Y-axis are shorter in overall length than the sections extending along the X-axis of frame structure 118 such that frame structure 136 can shift between positions B' and B" from its intermediate, or neutral position B shown in solid lines in FIG. 4. The frame structure 136 is preferably formed of a similar material as the frame structure 118 (e.g., a polymer composite material).

The large opening defined by frame structure 136 allows for frame structure 136 to extend out beyond the ends of frame structure 118 during a cutting process. Thus, frame structure 136 can assume an overhang relationship with the frame structure 118 to the extent that the Y-axis extending sections of frame structure 136 do not pass under central axis line 138 of nozzle head assembly 170 shown in FIG. 3. (A similar concept is present with respect to the X-axis side walls of frame structure 118 when shifting to positions to opposite sides of its neutral position A.) Although a variety of sizes are possible depending on the objectives of the user and the space available, in the illustrated embodiment, the X-axis distance of the opening defined by frame structure 136 is about 74" and the X-axis length of frame structure 136 constitutes about 65% to 85% of the overall length of frame structure 118 (which is about 100") with the maximum X-axis extension (i.e., the distance between positions B' and B") being about 120". The length of frame structure 136 along the Y-axis is preferably the same as that of the lower platform 118. These dimensions are for a relatively large fluid jet cutting system and, despite its large cutting area, provides for a compact storage area in that many of its components (e.g., abrasive supply, fluid tank, motor, etc.) can be positioned just outside of the Y-axis platforms and under the overhanging region of the X-Y support table.

The present invention's design thus allows for a large open area for cutting along the X and Y-axis, and the compact nature of the invention is furthered by an efficient use of the work table's underneath storage area. The present invention can also be made on a smaller scale, while still maintaining a relatively large open area for cutting which, coupled with its storage below the table, makes the present invention well suited for job shops and the like.

Just rearward of the position A' assumed by frame structure 118 is located Z-axis support assembly 140. Support assembly 140 is supported by platforms 104 and 106 and is bolted or otherwise fixed to sidewalls 146, 148 of platforms 104, 106. The connection of support assembly 140 to sides 146 and 148 (FIG. 5) of platforms 104 and 106 provides added rigidity and strength to the support means supporting the adjustable frame structures. Wing shaped catch tray members 150 and 152 (shown only in FIG. 3) are secured to Y-shift frame structure 118 and extend outwardly away from the exterior side of platforms 104 and 106 along the X-axis so as to extend out to positions B' and B" which represent the outer limits of the X-axis frame structure 136. Catch tray members 150 and 152 also extend out a distance equal to a half-foot or more in a Y-axis direction from the side edges of frame structure 118. Thus, catch trays 150 and 152 act to catch any splattered fluid, abrasive or waste material and includes one or more discharge outlets at a lower region (not shown) for subsequent removal of the fluid and waste material.

As best shown in FIG. 3, Z-axis support assembly 140 preferably includes material reduction openings 154 and 156 and preferably has converging side walls 158, 160. Front face 162 supports linear motor tracks or ways 164 and 166 (or a bearing assembly such as a roller or air bearing assembly if a different drive means is utilized) extending along opposite sides of opening 154. Extending out from front face 162 and in driving communication with tracks 164 and 166 is A-shaped frame structure 168 which is preferably formed of a light weight polymer composite material such as that used for frame structures 136 and 118. The A-shaped frame structure 168 extends out in cantilever fashion from tracks 164 and 166 and supports, at its apex, nozzle head assembly 170. Frame 168 includes at its two base ends linear motor drivers (or a connection to a ball screw or the like if some other driver is used) which travel along ways 164, 166 and include suitable brakes for fixing the A-shaped frame in the event of a power failure. A-shaped frame 168 preferably is of a length which positions nozzle head assembly 170 at about the center of opening 120 when frame structures 118 and 136 are in a neutral position. A cantilever length of about 40" is suitable for the purposes of the present invention.

Rather than a linear motor Z-axis connection between linear motor drivers and the ways, A-shaped frame 168 can be attached to support assembly 140 by other means such as a T-shaped slot in support assembly 140 with corresponding T-shaped inserts (with added roller bearings for easy sliding connection) provided at the ends of A-shaped frame 168 in combination with a hydraulic Z-axis adjustment system or the like. Alternatively, surrounding C-shaped flange members with internal rollers, etc. can be utilized. Z-axis shifting as well as added gravitational support can alternatively be provided by inter mashing tracks and a pair of gears driving by a common or commonly controlled driving member such as an encoded stepper motor. Alternatively, Z-axis shifting can be accomplished by one or more worm or ball screw gear combinations.

Further, the present invention contemplates a fixed Z-axis nozzle assembly (i.e., A-frame 168 is rigidly secured to support assembly 140) which arrangement is well suited for some situations wherein the X-Y axis shifting of the workpiece support assembly alone is sufficient. However, for most uses movement along the Z-axis is highly desirable as the inability to easily raise and lower the Z-axis height of the nozzle assembly is a significant drawback with prior art systems. This is especially true when dealing with other than flat workpiece sheets. Under the conventional system the operator needs to program the X-Y plane movement of the gantry crane supported nozzle head such that it swings around and avoids contact with clamps or higher level areas of the workpiece. This introduces added programming requirements, decreases in speed of cutting and added stress in operator performance in that particular attention must be made to ensure that undesirable nozzle contact with the workpiece or another component of the fluid jet system does not occur. Under the present invention, however, the height can be adjusted to ensure sufficient clearance for all possible objects of contact whereby there is greater freedom of operation without concern of hitting an object. Also, for some cutting operations under the present invention where high precision cutting is important, the nozzle head can be shifted under a programmed pattern to maintain a certain level above the surface of an object despite fluctuations in height in the object's surface.

Also, as another alternative of the present invention, A-shaped frame 168 can be fixed and nozzle head assembly 170 moved along the Z-axis with respect to the fixed end of A-shaped frame 168 by a linear motor arrangement or some other drive means extending along the Z-axis at the apex of frame 168. In each of the above scenarios, the main body of the nozzle head can also be provided with 4th and 5th axis adjustment (rotation) capability.

Between the interior surfaces or sides 146 and 148 of platforms 104 and 106, in front of support assembly 140 and below frame structure 118 there is provided catch or catcher tank reception cavity 172 (FIG. 3). Reception cavity 172 is designed to receive catcher tank 174 and moving platform 176. As will be explained in greater detail below, catcher tank or receptacle 174, in a preferred embodiment, is a 55 gallon drum of the type readily available on the market for other uses. Moving platform or carriage assembly 176 is designed to receive the bottom of catcher tank 174 and has rollers 178 or the like for facilitating movement at the desired time. Also, positioning bar 175, which has a substantially V-shaped contour extends across reception cavity 172 and is secured to platforms 104, 106.

Moving platform 176 can include lock means (not shown) such as caster wheel locks for added protection of against shifting of platform 178 after it is positioned in the desired location directly beneath nozzle head assembly 170. However, as the catcher tank is preferably at least partially filled with a liquid and/or abrasive material prior to first use, its weight would preclude movement when the supporting surface is sufficiently flat. The shape of positioning bar 175 is such that proper positioning of tank 174 under nozzle head assembly ensures that the central axis of the tank is aligned with central axis 138 which is in common with the central axis of nozzle head assembly 170 when vertically aligned. As nozzle head assembly 170 either stays fixed in position or moves only along the Z-axis, the tank once inserted need not be moved until the time for emptying arises.

Tank nozzle or outlet conduit 180 extends out from tank 174 at a position relatively close to the top (e.g., 3% to 50% of the tank's total height down from the top of the tank). Nozzle 180 opens into the interior of tank 180 for purposes to be described in greater detail below. Nozzle 180 can easily be threaded into a threaded side port commonly found on sides of 55 gallon drums. Nozzle 180 opens out into fluid chute 182 which is supported by and extends through platform 104. Fluid chute 182 opens into filter tank 184. Filter tank 184 features bottom 186 for receiving particulate matter and forward, upper level platform 188 having an opening in communication with waste water pump 190 which pumps filtered fluid to a drain or a recycling tank whichever is preferred.

Provided to opposite sides of feet 105 and 107 of platforms 104 and 106 are raised support surfaces 192 and 194. Raised surfaces 192 and 194 are designed for supporting and fixing components positioned thereon. Raised support surfaces 192 and 194 can represent legs of a unitary U-shaped structure with an opening provided in the area of catcher tank recess 172 and platforms 104 and 106 which are not supported by the U-shaped platform, but, rather, directly by undersurface 108. Around the periphery of the raised platform is provided raised liner 199 which helps retain fluid and debris within the platform's area. Also, to insulate platforms 104, 106 and assembly 140 from vibrations produced by the components of the system supported on support surfaces 192 and 194, support surfaces 192 and 194 can be comprised of a laminate structure which includes an upper plate(s) 195 and a cushion(s) (e.g., elastomeric pad(s) or the like) positioned underneath the plate(s) for damping out vibrations. As noted, Y-axis platforms 104 and 106 and Z-axis platform 140 are, on the other hand, directly secured to the floor with bolts or the like extending through feet 105, 107 of Y-axis platform 104, 106. Thus, vibrations developed by, for example, motor M (discussed below) are damped out and not directly passed on to platforms 104 and 106.

Figure 1:
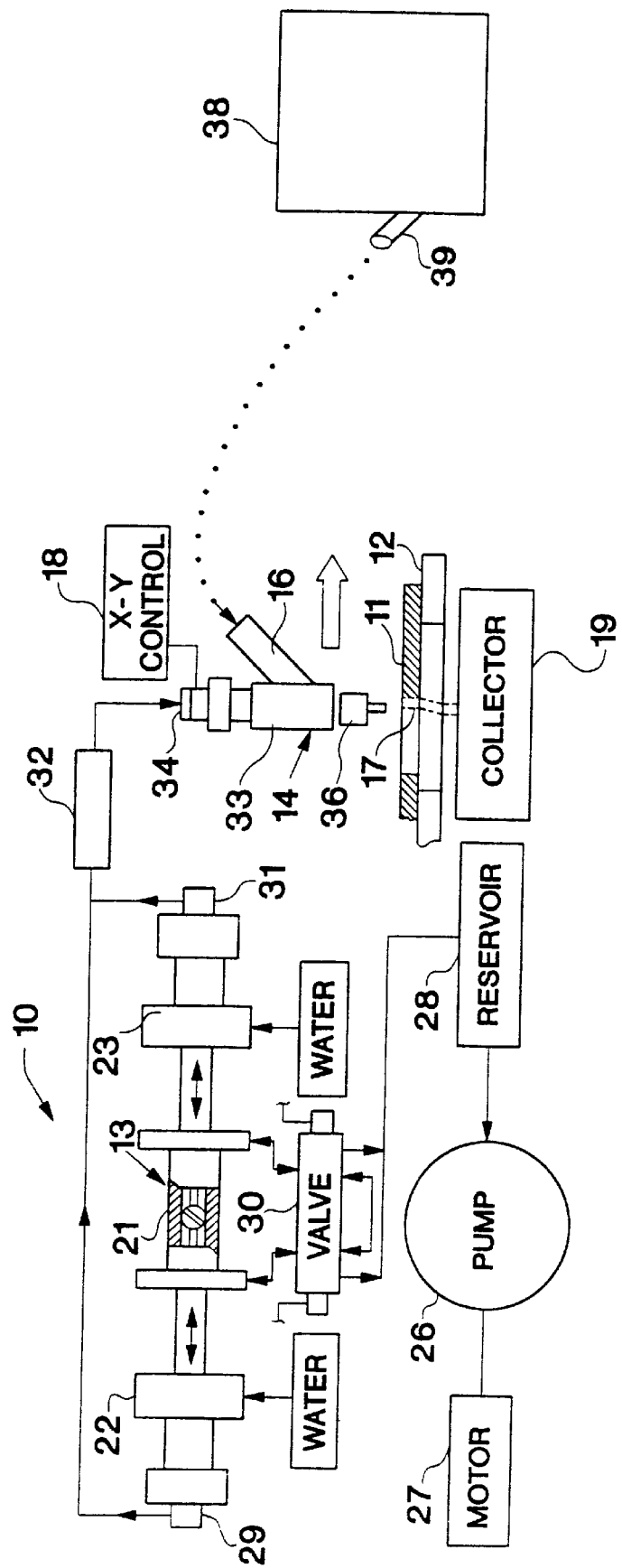
FIG. 1 shows, in mainly schematic fashion, a prior art waterjet system which uses abrasive.
Figure 2:
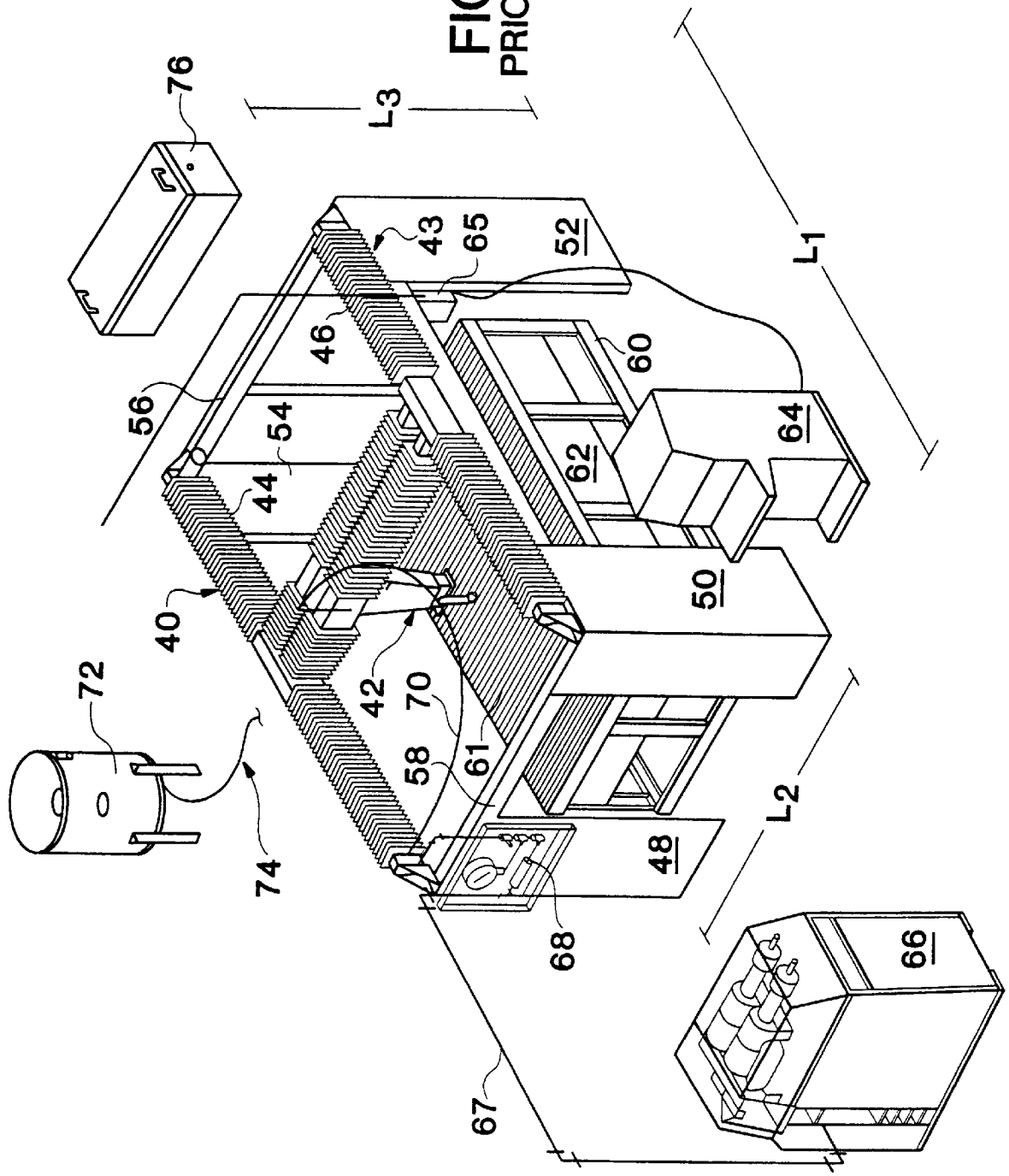
FIG. 2 shows, in less schematic fashion, a typical prior art waterjet system which uses abrasive.

As shown in FIG. 3, filter tank 184 is supported and fixed in position on raised support surface 192. Raised support surface 192 also supports poles 196, 198, 200, 202 which are best illustrated in FIGS. 2 and 4. Support triangles, such as the triangle 204 in FIG. 3 are also preferably provided for added support. Each triangle 204 and each of poles 196–202 is received by and fixed with respect to raised support surface 192. These members, however, can also be directly supported by underlying surface 108 as the raised support surfaces are optional or the bars could extend through apertures formed therein. Extending outwardly and at an upward incline with respect to the top of poles 196–202 are sliding bars 206, 208, 210 and 212. Sliding bars 206–212 extend upwardly at an angle θ (FIG. 3) which is preferably about 1–15° and most preferably about 5°. Each of sliding bars 206–212 includes at least one notch or recess represented by reference numbers 214, 216, 218 and 220 in FIG. 4. As also shown in FIG. 4, recesses 214–220 are staggered so as to be at different positions so that at least an adjacent recess is at a different position along the sliding bar. In this way, abrasive supply bags 222–228 can be supported by sliding bars 206–212 and staggered along the bars to provide a more compact arrangement.

Each of bags 222–228 includes a hook or loop upper support 230 which is adapted to slide along a respective one of sliding bars 206–212 for reception in a corresponding one of notches 214–220. Each of bags 222–228 has a converging bottom 232 which opens out into with an opening (not shown) designed for receipt with one of a plurality of fixed spouts 234 (fixed by, for example, a frame structure joined to platform 192). As shown in FIG. 4, the outlet ends of fixed spouts 234 are inclined inwardly and extend for different lengths such that the outlets of spouts 234 are aligned in spaced series with respect to vibrating feeder chute 236 positioned therebelow. Each of spouts 234 is also preferably provided with an opening and closing means for starting and stopping the release of the desired material into chute 236. One embodiment of an opening and closing means is described below. Although four supply bags and corresponding supports are shown in FIGS. 3–5, a lesser or greater number can be provided to suit the particular needs of the user. Bags 222–228 are preferably within a range of 40–120 pounds such that an operator can relatively easily hand carry a bag and hook loop 230 over the free end of one of sliding bars 206–212 such that gravity acts to slide the bag down until the loop is received within the notch or recess 214 formed in the slide bar. Upon a bag emptying, the operator can easily slide the bag back out as the weight is only that of the bag itself or, at least, less than the original weight if a partially empty bag is to be replaced with a different material bag. Also, the loop or hook type attachment allows an operator, during initial bag insertion, to easily swing a bag to one side or the other to avoid an adjacent full bag already positioned and to position the bottom of the bag within one of spouts 234. Optionally, the bags themselves can have a valve spout arrangement designed for feeding to the chute (e.g., a sufficiently long spout that can be angled, if desired).

One or more of the bags and/or spouts 234 can be opened at any one time depending upon the size of the bags, chute and abrasive feed system. The bags can also each contain the same abrasive to handle extended manufacturing using the same abrasive. Different materials can also be provided from bag to bag to add versatility as to the materials available and to provide rapid changeover when desired. Thus, upon one bag emptying an operator can easily open either a same type material bag (if the same process is to be continued) or can open a different material bag if a different process is to be conducted. Also as described in greater detail below, the bag opening and closing means can be automated and used in conjunction with sensing means for sensing when a bag has emptied or is near emptying or a timer system that automatically triggers the opening and closing of bags at particular time intervals are considered as possible embodiments of the present invention. This latter arrangement involving fixed time period changeovers would be particularly useful when the workpiece being cut is formed of different material or when a process involves automated feeding of the same series of workpieces over and over. Rather than bags that directly feed the abrasive system, one or more bins can be utilized which are filled by emptying bags of abrasive into the bin and then typically discarding the bags. Thus, the above mentioned supply bags, which are supported on the posts, are more easily recycled and therefore beneficial from that standpoint.

Although not shown in FIGS. 3–5, abrasive particles received by chute 236 are directed through a conduit to nozzle head assembly 170. A preferred abrasive feed system is described in greater detail further below.

As an optional, added component of the present invention, water purifier 238 is supported on platform 192 rearward of the rearward most position that can be assumed by Y-axis platform 118. Depending upon the size and type of the water purifier and the other components in the system, the water purifier 238 may also be positioned below the table. A variety of water purifiers are known in the art with reliance typically being on a reverse osmosis system which is suitable for the present invention. (However, the present invention's design, as explained in more detail below, is well suited for use without a filter of this type and can be used with a much simpler, and less expensive filter system, and can actually be free of an upstream filter assembly.)

Water purifier 238 receives water from a public source or from a recycling or settling tank (not shown) positioned downstream from pump 190. Water purifier 238 includes a conduit that extends to water booster pump 243 shown in FIG. 4 and conduits 240 and 241 (shown in cutaway in FIG. 3) extend from booster pump 243 into respective ones of two way valves 252, 254. Alternatively, if a water purifier is not utilized, conduits 240 and 241 would represent conduits in communication with booster pump 243 which receives water directly from a public source of water or a recycling tank, or through a simpler intermediate water filter. Raised support surface 194 supports assembly 242 which comprises motor M that runs controllable hydraulic pump 245 with the latter feeding oil through oil tubes 247 and 249 to opposite sides of central portion 245 of dual action intensifier 244. The hydraulic fluid is provided to intensifier through a reversing solenoid valve, for example, to pump up the water previously fed to one-half of the dual action intensifier while the other, low pressure half is filled with low pressure water from an upstream source. Motor M also runs oil circulating pump 251 which circulates return oil from the intensifier to chiller 246 before the oil returns to hydraulic pump 245. As shown in FIG. 4, assembly 242 also includes water booster pump 243 run by motor M. Oil reserve and oil chiller assembly 246 maintains a constant supply of low temperature hydraulic fluid such as oil to the hydraulic pump assembly 242. Upon the water being fed into intensifier reaching the desired pressure (e.g., 55,000 psi) water is released from intensifier through a respective one of high pressure conduits 248 or 250 via a respective one of the check valves 252 and 254 depending upon which half of intensifier 244 is being charged and which half is already filled. High pressure conduits 248 and 250 empty into attenuator 256 whereupon the water passes though attenuator 256 and out through feed conduit 258 extending from the central portion of attenuator 256 to its connection point with nozzle head assembly 170. Valve 249 is positioned at the top of nozzle head assembly and when opened directs high pressure fluid through to nozzle head assembly 170 and, when closed, prevents the high pressure fluid from passing through the head assembly.

Figure 6:
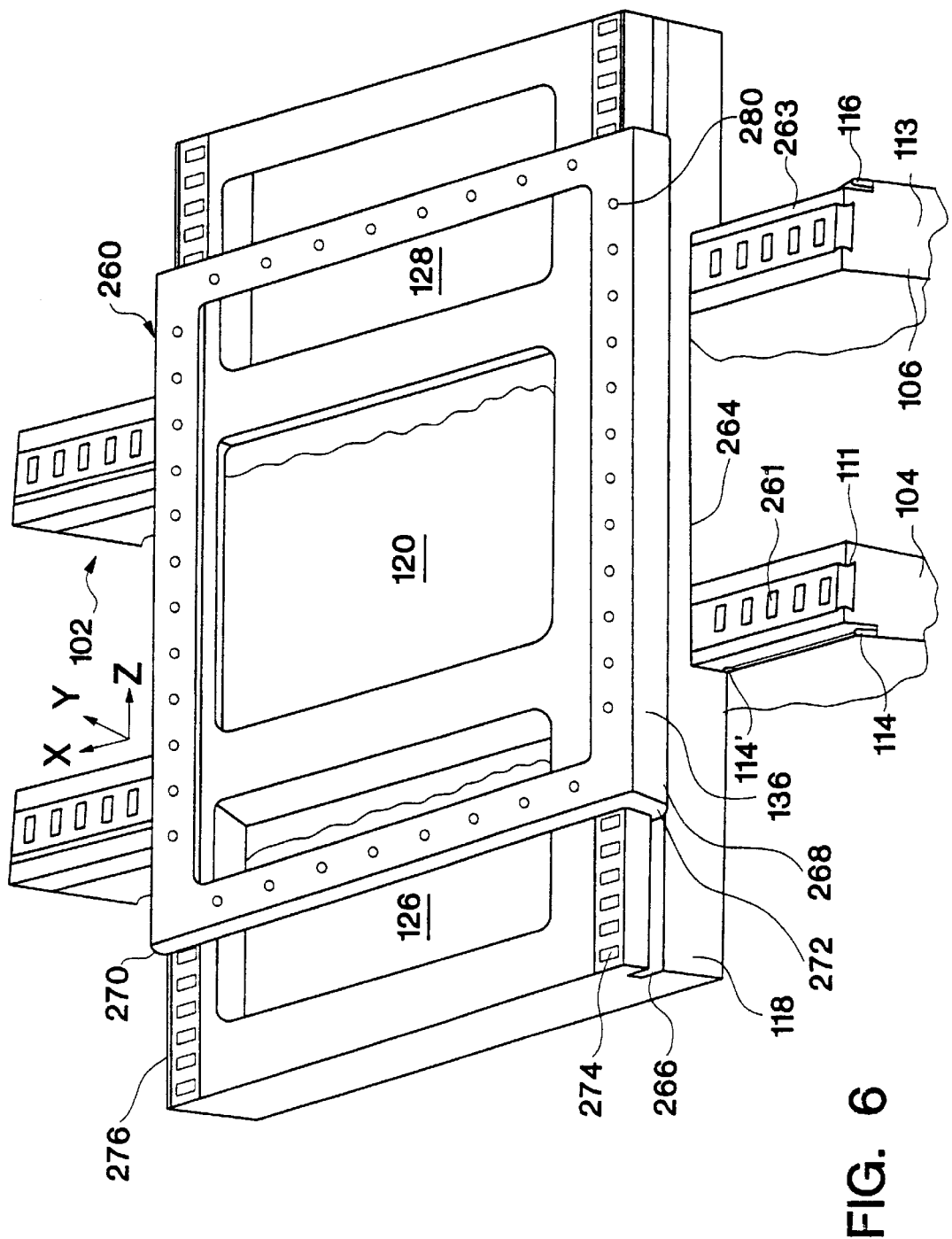
FIG. 6 shows a perspective view of a first embodiment of the present invention's X-Y adjustable workpiece support table.

With reference now to FIGS. 4 and 6–9 a more detailed description of some preferred embodiments for the workpiece support table assembly 102 is provided. As shown in FIG. 6, workpiece support table assembly 102 includes X/Y-axis support frame assembly 260 supported on Y-axis platforms 104 and 106. FIG. 6 also illustrates X/Y-axis support frame assembly 260 being comprised of Y-shift frame structure 118 and X-shift frame structure 136. Y-shift frame structure 118 is supported on platforms 104 and 106 and, as shown in FIG. 6, platforms 104 and 106 include linear motor ways 261 and 263 as well as side roller bearing assemblies 114' (not shown) riding on tracks 114, 116. Rather than linear motor ways, the top surfaces of platforms 104 and 106 can include bearing assemblies used with mechanical drive means. If linear motors are used, ways 110 and 112 can be affixed to platform 118 within supporting recesses 111 and 113. Rails 114 and 116, which support rollers such as roller 114' in FIG. 6 can be provided in addition to linear motors 110 and 112 (e.g., the addition of added bearings such as grooved rollers 114' in recess 264 helps avoid undesirable X-axis shifting of frame structure 118). A variety of other roller or bearing arrangements are also possible such as cylindrical rollers positioned within grooves in platform 118 which ride along the upper surface of platforms 104 and 106 and which are used in conjunction with rails 114 and 116 and their corresponding rollers.

FIG. 6 further illustrates Y-shift frame structure 118, in this particular embodiment, having longitudinal grooves 266 (one provided on each side although only one of the two being illustrated in FIG. 6). Received within grooves 266 is a bottom portion of C sectioned ends 268 and 270 of X-shift frame structure 136. Linear motor ways 274 and 276 can be utilized or one or both of the top and bottom of grooves 266 can represent the location for the ways of a linear motor supported on sliding extension 272 of X-shift frame structure 136. Alternately, C-sectioned ends 269 and 270 can be used for guiding purposes only. Instead of a linear drive motor, bearing members and an associated alternative driving means can also be provided between the sliding extension 272 and the receiving groove 266 or at the location where ways 274 and 276 are positioned. With this alternative arrangement, upper longitudinal grooves 274 and 276 provide bearing riding surfaces for bearings held in position in recesses in the bottom of frame structure 136 and used with associated alternative driving means. Alternatively, the area of ways 274 and 276 can be a suitable location for a driving rack or screw for a ball screw drive. Although not shown, the present invention also contemplates the inclusion of sliding stops to prevent undesirable movement of the frame structure 136 entirely off from the underlying support frame 118. Further, FIGS. 6 and 7 show a series of precision holes 280 extending along each side and along each end of frame structure 136.

Figure 7:
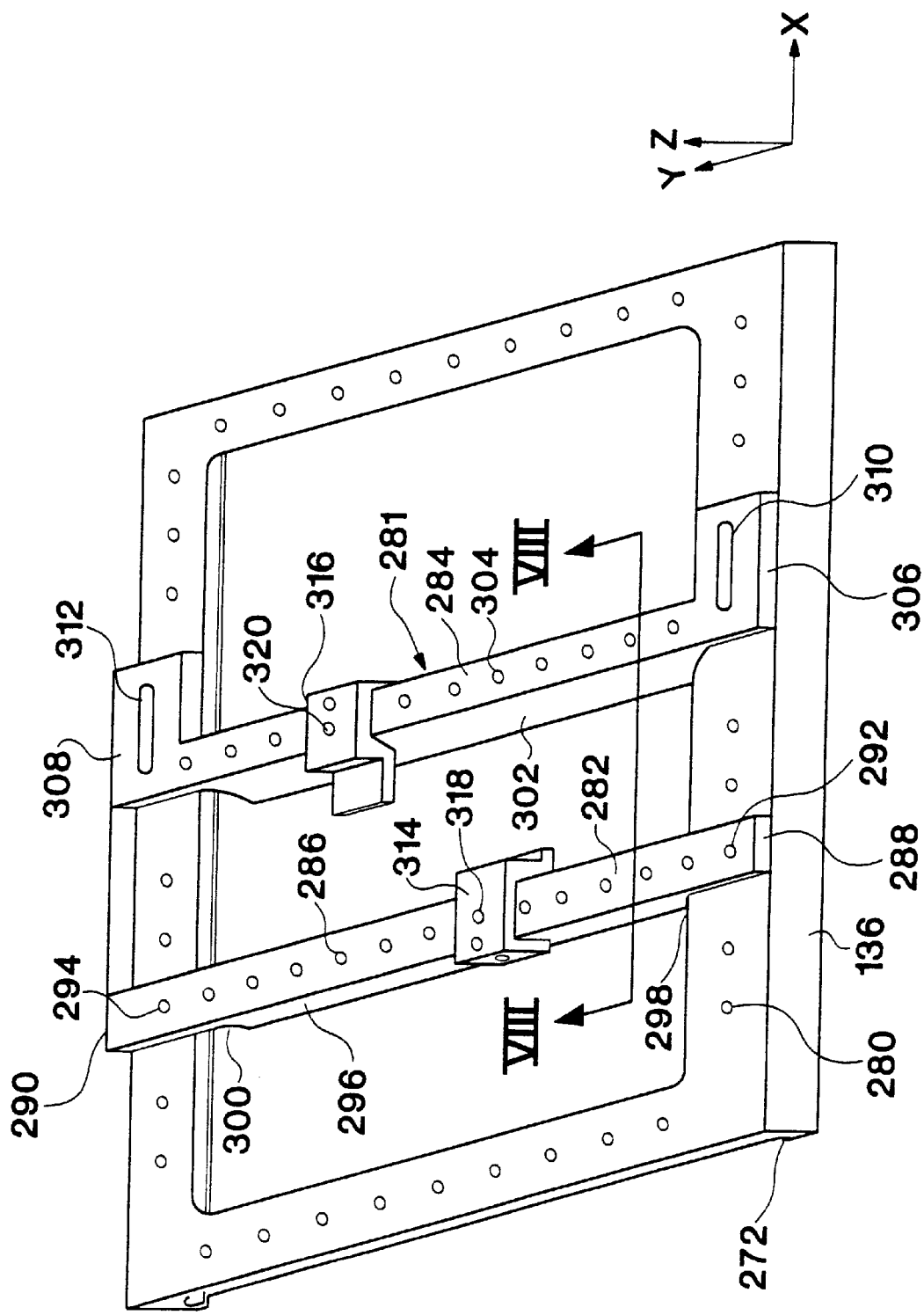
FIG. 7 shows a perspective view of the X-axis sliding workpiece support plate assembly with adjustable support rails and workpiece grasping members.

FIG. 7 also shows workpiece support assembly 281 which includes support rails 282 and 284 having ends that contact the upper surface of sides of frame structure 136. Although support rails 282, 284 are shown as extending along the Y-axis over the central opening, they can also extend across the opening along the Y-axis or a combination of X-axis and Y-axis support rails can be relied upon if the shape of the workpiece makes such an arrangement desirable. Side rail 282 includes a series of precision holes 286 which extend between ends 288 and 290 of rail 282. The two end precision holes 292 and 294 are positioned for alignment with precision holes 280 in frame structure 136 so that upon insertion of a fixing member such as a cylindrical insert or a threaded member, the rails 282 can be fixed in a desired position with respect to frame structure 136. For added rigidity in spanning the open area, support rails 282 feature thicker midsection 296. The thinner end sections 288 and 290 extend outwardly from the thicker midsection 296 and are secured in the desired position.

Second rail 284 is similar to first rail 282 in that it includes a thickened mid-section 302, a series of equally spaced precision holes 304 and thinner ends 306 and 308. Ends 306 and 308 are modified in second rail 284 so as to extend farther along in the X-axis direction. This allows for the inclusion of elongated slots 310 and 312. Elongated slots 310 and 312 allow for finer adjustments in positioning of rail 284 with respect to adjacent rail 282.

Workpiece support members 314 and 316 are supported in sliding fashion upon the upper surface of rails 282 and 284. Workpiece support members 314 and 316 each include a fastening hole represented by reference numbers 318 and 320 in FIG. 7. Fastener holes 318 and 320 align with precision holes 286 and 304 such that support members 314 and 316 can be clamped at the desired location along the Y-axis.

Figure 8:
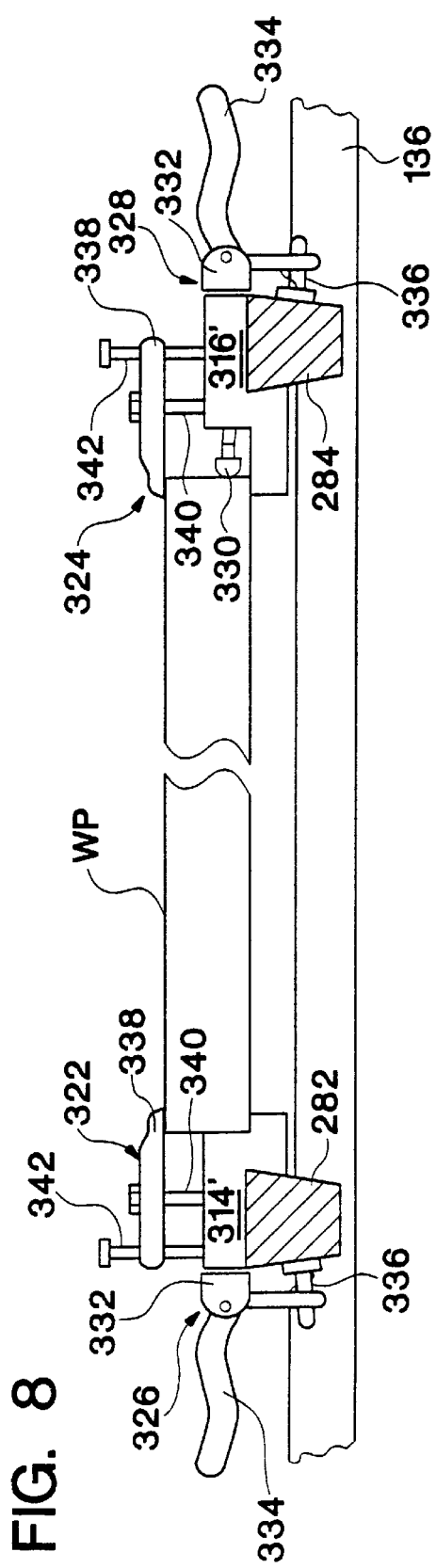
FIG. 8 shows a cross-sectional view taken along cross-section XIII—XIII in FIG. 7 of X-axis sliding workpiece support plate assembly with added illustration of a workpiece and workpiece grasping members.

FIG. 8 shows a cross-sectional view taken along cross-section line VIII—VIII in FIG. 7 with the additional features of workpiece WP and optional part clamp assembly sets 322, 324, optional toggle clamp sets 326, 328, and optional spring loaded button 330 for biasing workpiece WP against solid workpiece support member 314'. Workpiece support members 314' and 316' in FIG. 8 are shown by prime in view of the alteration in design over the arrangement in FIG. 7 which results from the optional components discussed above.

Support rails 282 and 284 have converging side walls which allows for workpiece support members 314 and 316 in FIG. 7 to assume a dovetail relationship with the rails so as to lock the support members along the Z axis. A somewhat similar arrangement exists with respect to workpiece support members 314' and 316' in FIG. 8 as those support members feature an inclined interior side wall with the toggle clamp assembly on each providing back fastening. As the toggle clamps provide the fastening means in one embodiment of the invention, precision hole threaded fastening is not utilized and, instead of threaded holes that can easily become plugged with debris, position markers or the like are provided such that the clamps represent the sole means of fastening. Toggle clamps 326, 328 each feature base 332 which supports, in pivoting fashion, L-shaped lever 334. Extending inwardly from the bottom leg of L-shaped lever 334 is pusher member 336 which preferably has an elastomeric contact end and a spring biased shaft received by the lower arm of L-shaped lever 334.

Optional part clamp assemblies 322 and 324 each feature clamp bar 338 designed for contact with the upper surface of workpiece WP and for holding the work and scrap pieces produced after a product has been cut out from the workpiece. Bolts 340 and 342 can be added to secure the clamps to the rail and prevent rotation of the clamps. In an alternate embodiment either fastener 340 or pivot prevention bolt 342 are provided for use together with the precision holes with one of the two acting as the member which is received by precision holes 286 and 304 and the other providing an added degree of pivot prevention means.

The above described X-Y support table assembly 102 is highly versatile such that a wide variety of different shaped parts can be held and accurately located with respect to the nozzle head assembly above. Further, the workpiece support table assembly 102 allows for cutting at essentially any point of the workpiece so that the areas which can be cut along the workpiece are expanded, and the chance for tooling and work table degradation due to inadvertent abrasive jet contact is reduced.

The openness of the Y-shift frame structure 118 and the X-shift frame structure as well as the workpiece support assembly 281 is particular advantageous from the standpoint of being able to accurately control the workpiece positioning with respect to the fluid jet that exits nozzle head assembly 170 and essentially travels along the center line 138 shown in FIG. 3. Fine precision cutting is made easier particularly when a linear motor or a stepper motor arrangement is provided on the X and Y-shifting frame structures 118, 136 and are placed under the control of a programmable central control assembly. In this way, the exact location of the cutting point of the fluid jet with respect to the workpiece supported can be highly accurately controlled and its relative position known at all times during processing of a workpiece and from workpiece to workpiece.

Moreover, since nozzle head assembly 170 either remains stationary during the cutting process or is limited to Z-axis movement, there is avoided the inevitable inaccuracies caused by a nozzle head assembly which moves along the X and Y axes under gantry crane or the like support during the cutting process. The inaccuracies under the gantry crane support design can be attributed in large part to inertial nozzle head shakes that are created whenever the head abruptly starts, stops or turns. Additional inaccuracies are created by temperature expansion and contraction along the supporting gantry crane support system. The limiting of head assembly movement to one axis allows for better control of the workpiece with respect to the head assembly and avoids the inertial shaking associated with the prior art systems.

Moreover, while the present invention can include a stationary nozzle head assembly, particular advantages are obtained upon providing nozzle head assembly with Z-axis movement. With the rigid Z-axis support assembly 140, many of the inaccuracies posed by the prior art overhanging gantry systems are avoided. Also, with the ability to shift the nozzle head along the Z-axis, greater flexibility and accuracy in cutting can be achieved. For example, a fluid jet can more easily pierce through material when it is spaced a sufficient distance off (e.g., ½) from the piece to allow for fluid escape. Once the hole is formed, the nozzle head assembly can easily be moved closer to the workpiece (e.g., within 1 to ⅝₁₀₀₀") such that the amount of energy dissipated before cutting contact is minimized. Also, the adjustability along the Z-axis allows the operator to set a single height whereby rapid movement of the head can be carried out without fear of coming in contact with an obstruction.

Also, to achieve a highly uniform cutting, especially with a contoured workpiece, the Z-axis movement of the nozzle head can be controlled by the controller simultaneously with the X-Y axis control such that the distance between the workpiece and nozzle outlet is maintained constant despite differences in the upper surface of the workpiece being cut. In addition, the rigid support for the nozzle head assembly 170 also provides a good foundation for providing 4th and 5th axis movement (e.g., along the X/Z and Y/Z planes, respectively) to the nozzle head assembly if a more complex system is desired. Fourth and fifth axis movement in nozzle head assembly 170 allows for angle cuts and compensation for the taper or inclined cutting edge typically formed by fluid jets. Accordingly, the present invention allows for more sophisticated cutting which previously was not available or practical in the industry due to the limitations of the prior art systems.

Under the present system, rough contour cutting is made possible due to the speed and high range in speeds possible, and acceleration capabilities of the linear motor powered workpiece support table assembly. For example, linear motors can run at a velocity over 5 m/sec (200 IPS) and also have the capability of low speed movement (e.g., a velocity range of 1 micron/sec to 5 m/sec). In addition to their fast speed, linear motors have the advantage of fast accelerations and decelerations (e.g., accelerating to 4 g's with velocities to 1 m/sec, 40 IPS). Ball screws, rack and pinions, and lead screws have critical speed limits and belt drives exhibit clogging and have poor low velocity performance. Also, linear motors have high ratio of peak force to motor inertia (about 30:1 for example). Therefore, almost all the motor force can be used to accelerate the moving load and perform useful work. This is unlike typical screw drive systems wherein at high accelerations, a large portion of the motor torque is lost in overcoming the inertia of the motor, coupling, and screw. With the high acceleration, deceleration and velocity capabilities of a linear motor, very fast processing times per workpiece can be obtained under the present invention's open, shifting X-Y frame assembly 102. Also, with the high speeds and rapid acceleration and deceleration, rough contouring is made possible as the workpiece can be shifted fast enough to change the depth of cutting. For example, by setting varying circular speeds (fastest table movement on cutting the radial exterior) and not as fast in the exterior, a concave cavity can be formed. Also, in an X-axis reciprocating fashion, with minor is Y-axis shifting, the speed of the workpiece movement with respect to the nozzle jet an be varied so as to be initially fast then slow in one direction and initially relatively slow then fast in the reverse direction so that a similar depth is achieved along the X-axis of movement whereby a curved side recess can be formed in the workpiece. The channel formed during the X-axis movement can be initiated at an edge of the workpiece so as to facilitate fluid exiting from the workpiece.

Variations in fluid pressure and/or abrasive feed amounts can also be used either separately or in conjunction with the table speed variations to achieve contouring in the workpiece. However, changes in abrasive amount and fluid pressure are not as easily precisely controlled as the variations in speed of the table due to such factors as a delay in changeover.

The speed and acceleration capability of the linear motor driven X-Y support table also makes the present system more practical for cutting easily cut material such as soft rubber or cardboard as the speed of movement of the table is more commensurate with the cutting speed of the jet whereas ball screw drives did not as efficiently utilize the cutting speed of the jet.

Particularly advantageous features of the present invention are brought about by the open, X-Y axis shifting table of the present invention. For instance, with the arrangement of the invention there is avoided the need for a catcher tank which coincides with the size of the cuts to be made in the workpiece (i.e., envelope). This allows for a more compact design because components such as the oil filter and reservoir, pump system for the intensifier filter tank, etc. can be positioned under the periphery of the possible X-Y table positions. Yet, the compact design of the present invention still allows easy access to all of the components. Accordingly, the present system is available for many locations which, prior to the present invention, were just too small to handle such a system and, for locations which could handle a larger system, provides added room for additional unrelated manufacturing equipment.

The present system with its avoidance of X-Y shifting of the nozzle head assembly also avoids the relatively expensive and energy absorbing high-pressure swivel elbows and high pressure plumbing (see line from intensifier 66 in FIG. 2) associated with a gantry crane system for supporting and moving the nozzle head. In the present invention, the only required high pressure tubing is tube 258 which extends directly from the attenuator to the nozzle head and two short high pressure tubes extending between intensifier. 244 and attenuator 256 as discussed further below. The length of high pressure tube 258 can thus be made less than 100". Further, the entire length of high pressure tubing throughout the system can be made less than 150", and preferably less than 100".

The present invention also avoids the complexities and added equipment and potential problems associated with having a catcher tank that is required to move in unison with an X-Y-shifting nozzle above. The open table arrangement of the present invention also avoids tooling consumption which represents a problem in some prior art systems. The X-Y shifting table of the present invention, particularly when formed of a lightweight composite material, provides for the use of highly accurate linear motors with linear time-monitoring as well as roller ways or bearing assemblies which can be manufactured to a high degree of precision.

Figure 9A:
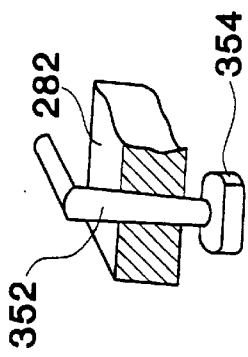
FIG. 9A shows a sliding and lockable support rail.
Figure 9:
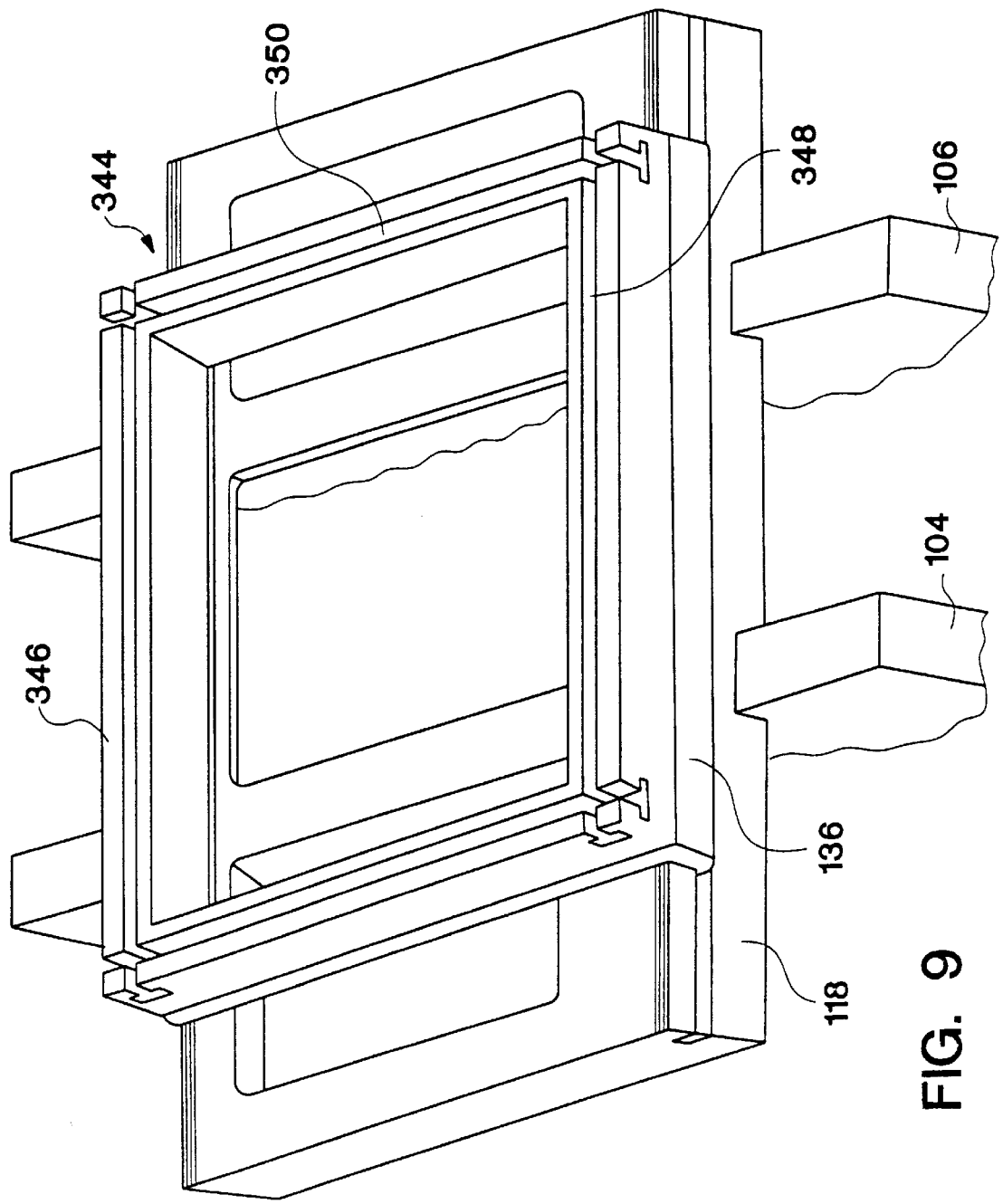
FIG. 9 shows a perspective view of a second embodiment of an X-axis sliding plate assembly.

FIG. 9 represents another embodiment of the present invention and includes quick change workpiece support table 344 (the drive means not being shown in the illustration). Support table 344 is essentially the same as the embodiment illustrated in FIG. 6 except for the additional inclusion of a removable pallet 346. Removable pallet 346 has an open central area and pallet 346 is secured to and aligned with respect to frame structure 136 by any suitable means including magnetic, sliding slot, t-slot or a threaded bolt arrangement (e.g., particularly one which utilizes the precision holes 280 formed in the previously described frame structure 136). The top of pallet 346 includes t-slots 348, 350 that extend along the X and Y axes and intersect one another at the four corners. T-slots 348 and 350 allow for the sliding of a t-shaped extension member extending off from a support rail assembly like those shown in FIG. 7. As shown in FIG. 9A by appropriately sizing and shaping the sliding extension member, the sliding extension member can double as a locking member. FIG. 9A illustrates extension member 352 which is designed for receipt within T-slots 348 and 350. Sliding/fixing members 352, provided at each end of support rail 282, slide along the parallel-arranged t-shaped slots (either the X-axis or the Y-axis) and when at the appropriate location can be twisted such that the slightly larger but slightly deformable end member 354 of sliding/fixing member 352 is fixed within the base of the corresponding t-slot. Corresponding cavities (not shown) can also be formed within the t-shaped slots to facilitate proper alignment. This arrangement allows for rapid positioning and fixing of the workpiece support rails at the desired location with respect to support table 344. Also, through utilization of removable pallet 346, once a workpiece reaches the final stage of processing, the pallet can be easily removed and a new pallet with a previously fixed in position workpiece can replace the removed pallet.

The present invention also features improved nozzle head assembly 170. FIGS. 10 and 11 illustrate a prior art nozzle assembly 356. As shown in FIG. 10, nozzle assembly 356 is comprised of nozzle tube/seal member 358, main body 360 and focusing tube or focusing nozzle 362. Nozzle tube/seal member 358 includes upper end 376 which is fixed to a high pressure fluid conduit (such as one leading from a main control valve) and its opposite end is fixed to main body 360 by nut 364. Nut 364 features an externally threaded, internal member 366, a central aperture 368 through which nozzle tube/seal member 358 extends and outer flange (with seal) assembly 370 which seals with the upper portion of main body 360. Tip 372 of nozzle tube/seal member 358 is received within throughhole 374 of main body 360. Threaded cylindrical housing 367 helps center nozzle tube/seal member 358.

Fluid from the high pressure conduit attached to tip 376 flows through channel passageway 378 formed in nozzle tube/seal member 358. Fluid exiting member 358 passes through throughhole 374 and into contact with orifice assembly 380. Orifice assembly 380 is typically formed of a hard material and often includes an insert of a jewel material such as ruby, sapphire or diamond. Orifice assembly 380 includes a small diameter central passageway through which the fluid passes and accelerates into a jet stream. The fluid jet stream then passes through central passageway 384 of wear insert 382 which central passageway 384 aligned with the central passageway of orifice assembly 380. Central passageway 384 of wear insert 382 opens up directly into focusing nozzle 362.

Wear insert 382 also includes transverse passageway 386 which is in communication with abrasive inlet fitting 388. A plurality of centering inserts 390 are provided to center the orifice assembly 380 within throughhole 374. Further, threaded holder 392 is used to fix in position wear insert 382, while threaded holder 394 fixes focusing nozzle 362 in position.

In operation, the high-pressure fluid passes through hole 374, orifice assembly 380, central passageway 384 and out through focusing tube 362. While passing through wear insert 382, the fluid creates a suction effect with respect to transverse passageway 386 whereby abrasive material fed to abrasive inlet fitting 388 is drawn in with the fluid, mixes therewith, and travels out with the fluid jet through nozzle 362.

As the intermixing of abrasive material with the fluid jet presents a harsh environment with respect to wear insert 382, wear insert 382 often requires replacement. Such replacement requires a shutdown of the entire assembly and often times an extended shutdown while the insert is positioned and checks made to ensure that the exiting fluid jet will contact the partially cut workpiece at the desired location. Another disadvantage associated with the prior art is the loss of energy in the fluid jet stream which is created by the arrangement of the abrasive material inlet with respect to the fluid jet stream. In other words, the incoming abrasive material deflects the jet stream causing the combination to make contact with the wear insert. Also, the transverse introduction acts to slow down the jet stream as the two different directed streams first collide before eventually becoming aligned along a common direction of travel. This loss of energy results in loss of potential cutting performance and cutting speed.

An additional disadvantage in the prior art relates to the difficulty of centering the nozzle tube. A non-aligned nozzle tube can result in increased wear of the interior of the nozzle tube and hastened replacement and/or an undesirable deflection of the nozzle stream or expansion in the stream's width. Also, a non-aligned nozzle stream results in misalignment of the jet stream's contact point with the workpiece, thus making precision cutting difficult. On the other hand, the present invention's precise positioning of the workpiece through use of the above described advantageously designed Y/X axis table assembly and single axis nozzle assembly is taken full advantage of in the present invention by also ensuring accurate and precise fluid jet positioning with respect to the workpiece positioned below the nozzle head assembly (as discussed below). This combination of precision ensuring features allows one to utilize a preexisting workpiece sheet's side edge as a starting location rather than having to form a product by a cut totally made internally of the workpiece sheet's exterior edge.

A further disadvantage in the prior art designs lies in the fact that the abrasive material can quickly wear out the abrasive inlet fitting requiring replacement as well as careful monitoring of the replacement parts availability to avoid an extended shutdown in the system.

Figures 12, 13:
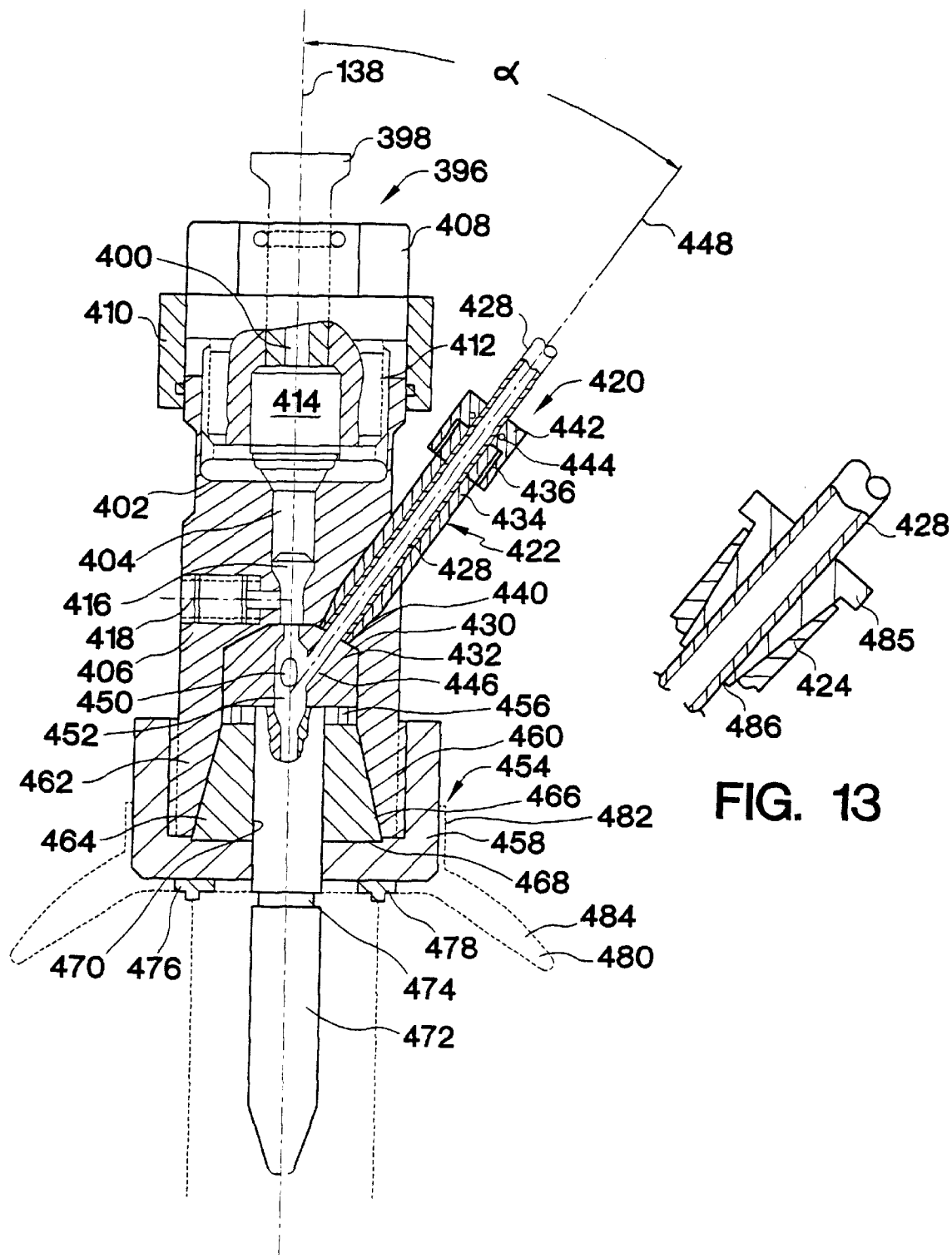
FIG. 12 shows a cross-sectional view of a head assembly according to the present invention.
FIG. 13 shows a cross-sectional view of a tube clamping assembly according to the present invention.

The present invention provides an improved nozzle assembly which avoids the noted problems with the prior art. For an illustration of the improved nozzle assembly embodiments of the present invention reference is made to FIGS. 12, 13 and 20 and 20A. As shown in FIG. 12, nozzle assembly 396 includes nozzle tube/seat 398 with central passageway 400 for the introduced high pressure water. End 402 of nozzle tube/seat 398 is seated upon the inlet end of throughhole 404 formed in main body 406. Nozzle nut 408 with its external flange 410 (with seal) and internal threaded member 412 is secured to the upper end of main body 406 such that nozzle tube/seat 398 is retained in position. Internally threaded cylindrical insert 414 is also provided for holding and centering member 398 in the desired position. Orifice assembly 416 is received at the downstream end of throughhole 404 and is retained in position by one or more threaded insert members 418.

The present invention features an improved abrasive feeding assembly 420 and, in a preferred embodiment, at least three and more preferably four (or even more if space allows) feeding inserts 422 are provided in evenly spaced arrangement about main body 406 (e.g., four arranged at 90° intervals along a circumferential circle encircling main body 406). FIG. 20 represents one embodiment of a multiple abrasive material feed assembly 580 which includes a multi-port abrasive feed insert arrangement 424. Assembly 580 is described in greater detail below, but reference is made to the multiple abrasive material insert locations such as 614, 616, 618, which extend directly into housing 426, as a similar arrangement of abrasive material inserts would be involved in the FIG. 12 arrangement except for the cross-sectional view of FIG. 12 being for a nozzle assembly having three abrasive feed inserts spaced 120° apart rather than the four shown in FIG. 20.

FIG. 13 illustrates a preferred embodiment for fixing a conduit such as conduit 428 with respect to an external support such as sleeve 434. As shown in FIG. 13, a somewhat flexible or compressible nut having a tapered thread extension 486 is threaded into a threaded recess area formed in sleeve 424 or, alternatively, into a tapered threaded reception area formed directly in main body 406. The threaded reception area in either case is formed with a corresponding tapered threaded end that receives the tapered extension 486. Upon tightening down on nut 485, tapered extension 486 compresses against the tube 428 so as to fix it in position. This connection and the earlier described connection in FIG. 12 have the advantage of allowing tube 428 or a similar conduit to pass through the sleeve so as to use this as the component which is degraded rather than the more expensive and more difficult to maintain in stock surrounding components. Further, as the tube will wear essentially the same both internally and externally of the main body 403, it is easier to monitor the wear condition, and the entire tube can be replaced at the appropriate time, rather than two separate wear replacement requirements.

As flexible tubing 428 (FIG. 12) is a relatively inexpensive material and can be supplied in large rolls making for ready replacement, rather than utilizing a prior art abrasive inlet fitting such as 388 in FIG. 10, feeding insert assembly 422 is designed such that tube 428 extends all the way through main body 406 to the interface surface 430 of modified wear insert 432 of the present invention. Feeder insert assembly 422 further comprises metallic outer sleeve 434 which has threaded outer end 436. Opposite end 438 of sleeve 434 can also be threaded for threaded securement within threaded recess 440 formed in main body 406. Tube 428 is clamped with respect to sleeve 434 by hose collet 442 which threads onto threads 436 of sleeve 434 and includes a compression insert which is formed of a metallic, plastic or higher-friction material such as rubber, and which is shaped so as to be forced inwardly against the exterior of hose 428 upon further threading of collet 442.

FIGS. 20 and 20A illustrates an alternate embodiment for fastening the abrasive feed tubing such as tube 604. FIG. 20 illustrates multi-port abrasive feed insert arrangement 424 feeding into nozzle head assembly 170 and nozzle head assembly support 171 (e.g., 171 can be a member fastened to A-frame 168 or part of A-frame 168 itself). Rather than utilizing sleeve 434 as in the earlier embodiments, the upper section 426 of modified main body 406' in FIGS. 20 and 20A includes a tapered, threaded reception area for receiving tapered nut 615 at insert location 614. Similar to the embodiments in FIGS. 12 and 13, tubing 604 extends through tapered nut 614 all the way to face 430 of insert 432 wherein the end of tubing 604 opens out into passageway 446 in wear insert 432. By periodic replacement of tubing 604 the wear replacement part problems associated with the prior art can be avoided.

The present invention thus also features a modified wear insert 432 (FIG. 12) which features obliquely arranged abrasive feed passageways 446 with only one of three (or four) shown in full detail in FIG. 12. Each passageway 446 has a central axis which is in common with central axis 448 of corresponding feed insert 422. Angle alpha (α) is formed between central axis 138 of the nozzle assembly 396 (particularly nozzle tube 398) and the common central axis 448 of insert 422. Angle α is preferably an acute angle and as close to vertical as possible such as an angle from 15 to 45° and more preferably 15 to 25°. Each of the 3, 4 or more passageways 446 have an outlet opening 450 which opens out into throughhole 452 formed in wear insert 432 so that the 3, 4 or more passageways 446 feed abrasive material simultaneously and from numerous, equally spaced points along a circumferential circle encompassing wear insert 446. The fluid jet stream is thus not deflected as in the prior art where only a single side insert is used. Thus, improved centering of the fluid jet with respect to the nozzle tube is achieved, and the loss of energy due to fluid jet abrasive/component/collision and swirling above multiple feed ports (as in some prior art arrangements) is also lessened.

In addition, as the orifice assembly (e.g., a diamond member with small diameter hole inserted in a hard metal holder) accelerates the fluid jet 2½ to 3 times the speed of sound, a strong venturi effect is created which sucks abrasive material into the centralized stream of fluid. Therefore, the stream is not deflected and there is less loss of energy in the fluid jet stream traveling through the system. Moreover, by having the feed inserts arranged at the angle of α with respect to the vertical, gravity assists in providing the abrasive to the fluid stream so that the abrasive material is more easily drawn into the fluid stream. Also, the incline provided in the feed inserts means that there is some avoidance of momentum loss at the time of fluid jet abrasive collision. Moreover, unlike some other prior art systems, this arrangement of the present invention is not of the type which can be easily clogged or which introduces added wear problems. In fact, the fact that the fluid jet is assisted by the arrangement of the abrasive to stay centered results in less chance of the fluid jet being deflected and forcing the abrasive into high wear deflection contact with the wear insert. Tubes 428 can also continue through all the way through to openings 450 in wear insert 432 rather than stopping at interface 430. However, the contact and interface of the bottom edge of the tube helps avoid axial displacement of the tube. A flange at opening 450 could be provided to abut a further extending tube but would be difficult to manufacture and thus less desirable.

Wear insert 432 can be held in position through use of threaded inserts as in the prior art. Alternatively, centering collet assembly 454 can be utilized as the sole means of fixing wear insert 432 into position or as an additional fixation means. The possibility of having collet assembly 454 as an added means for the securing of cylinder wear insert 432 is based upon the inclusion of an elastomeric ring or cylinder which is designated in FIG. 12 by reference 456.

Ring 456, which can be a O-ring or the like, is shown in dashed lines in view of its optional nature.

The collet assembly 454 features collet cup 458 having internal threads 460 for threaded engagement with threaded bottom end 462 of main body 406. Truncated collet 464 is slidingly engaged within a corresponding cone-shaped recess 466 formed in bottom end 462 of main body 406. Collet 464 is preferably one of the types that features solid plates circumferentially arranged and separated by elastomeric dividers, or is of a solid material (e.g., spring steel or brass) with a plurality of splits at one end which extend toward the opposite end but are spaced from that end and a plurality of splits at the opposite end which are offset from the first split set and extend toward but not all the way to the opposite end. Collet 464 has lower face 468 in abutting relationship with the interior bottom surface of collet cup 458. Also, insert 464 includes central passageway 470 which is sized so as to receive nozzle tube 472. Accordingly, with the present invention, upon tightening collet cup 458 with respect to the threaded lower end 462 of main body 406, an appropriate central positioning for nozzle tube 472 is ensured and the collet insert 464 acts to lock, through compression, nozzle tube 472 in place and the top end of insert 464 comes in contact with elastomeric ring or cylinder 456 to place it in a compressed state. Thus, under the present invention, the survivability of the nozzle tube 472 is enhanced as there is less tendency for a misaligned nozzle tube coming in contact with the centralized abrasive fluid jet and one can more accurately locate the fluid jet with respect to the location of actual workpiece cutting. This provides for a much better match with the planned cutting pattern. Also, the ability of collet 464 to accurately center the nozzle conduit with the central axis of the nozzle head assembly helps avoid any loss of accuracy in the fluid jet cut. Thus, the accuracy gained in the use of the X-Y axes support table, centralized abrasive feed, etc. is not lost during the time the fluid is exiting through the nozzle conduit.

An additional problem associated with the prior art assemblies is the damage caused when the tip of the nozzle tube is inadvertently forced into contact with another component such as part of the support table or the product being worked upon. In these circumstances, the deflection of the nozzle tube often results in internal damage or misalignment with respect to the components within the interior of main body 406. In a preferred embodiment of the present invention nozzle tube 472 includes circular recess 474 which is positioned so as to be within five centimeters or so of the exterior bottom surface of collet cup 458 (more preferably 1–5 cms down from the bottom of collet cup 458). The circular recess 474 forms a weakened section within nozzle tube 472 such that upon nozzle tube 472 abutting another object with sufficient force, internal damage is avoided as the portion of the nozzle tube below weakened area 474 breaks off. The present invention also contemplates other means for allowing potentially damaging forces from extending internally within the body 406 such as the inclusion of an intermediate joining member for attachment to an upper and lower nozzle tube section which intermediate area is either formed of a more easily breakable material or material which can deflect to absorb some of the force (e.g., a rubber sheet encircling and joining two independent nozzle tube halves (not shown)). The formation of circular recess 474 is however preferred due to the ease in manufacturing and low cost associated with such an arrangement.

FIG. 12 illustrates an additional feature of the present invention which is particularly useful with respect to the X-Y shifting table arrangement of the present invention. The present invention features edge locators such as four detection members equally positioned 90° apart along a circumferential circle formed at the bottom of collet cup 458. In FIG. 12, two such edge detectors 476 and 478 are illustrated. Any suitable edge detection means such as a light and photo-sensitive transducer can be utilized for edge detection means 476 and 478. Alternatively, collet cup can be unthreaded and nozzle insert 472 can be replaced with an edge detector (represented schematically as E in FIG. 12) having a diameter similar to nozzle insert 472 so that it can be similarly clamped in place upon collet cup 458 being retightened. The centralized edge detector can take on a variety of forms including the deflectable ball type edge detectors used on other machines in the industry.

These edge detection members (and particularly the multiple (3 or 4 preferred) edge detector assembly shown) are in communication with the control assembly which is in communication with, among other components, the driving motors adjusting the X-Y support table assembly 102. While a single centrally positioned edge detector is possible, the use of 3 or 4 edge detectors equally circumferential spaced and supported on collet 468 is preferred as it avoids having to remove the nozzle insert and allows for ongoing analysis during actual cutting. That is, by comparing the results of three or more circumferentially positioned edge detection members, and based on the fact that the edge detection members are a fixed distance away from the center of the nozzle and are in a known position with respect to each other, these detection members can be used as an early warning system for showing that the cutting process is to be discontinued within a fixed time period or distance. Also, the edge detection members provide a useful means for initial location of the nozzle head at the time of start-up as well as location monitoring when an outside edge is to be cut. Thus, under the present invention, rather than always having to start a cut inward from an exterior edge of a typical raw supply of material to be formed or cut (which fluctuates within a certain tolerance range), the precision control provided by the shifting X-Y workpiece table assembly and preferably the added assured positioning provided by the edge detection means and centered fluid jet, allows for cutting at a starting position which is the same as an external edge of the raw product. This reduces the amount of scrap produced. Also, with the fourth and fifth axis adaptability of the present invention's arrangement, it is possible to avoid the common tapered-edge formation inherent in fluid jet cutting (due to the expansion of the jet in travelling through a product) by introducing a compensation angle in the direction of the fluid jet.

FIG. 12 features an additional advantageous feature of the present invention which is found in splash guard 480. Splash guard 480 is shown in dashed lines as it represents an added, optional feature of the present invention. Splash guard 480 is preferably formed of a rubber material and features an interior cavity defined by rim 482 and has bowl-shaped cup 484 which is sized so as to expand over and become fixed to the lower end of collet cup 458. If edge detectors are utilized appropriate apertures are formed in the guard and can also help to avoid damage to the detectors. In the prior art assemblies, the fluid and abrasive material that is reflected back or splashes back from the underlying structure can quickly degrade main body 406 and the other associated components. The splash guard helps avoid this and provides an inexpensive member that can be replaced upon becoming too degraded as it protects the structure above the guard from damage.

As noted above, because the fluid jet center line is maintained constant during the cutting process, the use of a much smaller and stationary capture chamber or receptacle is made possible. FIGS. 14–16 illustrate a few preferred capture tank assemblies 488 for the present invention. FIG. 14 illustrates in cross-section energy absorption insert assembly 490. Energy absorption insert assembly 490 features a solid body insert 492 which is preferably cylindrical in shape with perforations 499 formed in an upper region thereof. The perforations in perforated insert 492 can be limited to perforations 499 in the first embodiment which are spaced about 6 inches (15.25 cm) below the top of the insert cylinder whereupon the fluid, abrasive and scrap are caught by insert assembly 490 and the fluid pours out of perforations 499. Alternatively, perforations can be provided either by forming insert 492 of a mesh 491 or by forming the insert of a perforated material 491' (having smaller perforations than perforations 499) throughout a cylindrical metallic body. The former mesh arrangement is schematically illustrated in FIG. 14 and the smaller perforation arrangement in FIG. 15 (with only a portion of the perforated area being shown for draftsman's convenience). The upper perforations 499 are positioned high enough and sized for removal of liquid mainly which first passed out of perforations 499 and into the exterior annular recess defined between the interior of drum 516 and exterior of insert 492. In this area there is little turbulence such that the waste and abrasive material can freely settle whereupon the remaining fluid which is free of most of the solids can then float out of exit tube 518 when the fluid level sufficiently rises in the annular recess between the drum wall and insert. The drum and insert can be filled to just below the exit port of the drum whereupon a new drum and insert can replace the filled drum. In the other embodiments, the perforations 491 and 491' are sized to allow the smaller scrap and fluid to escape, but not the typical leftover abrasive, leaving a cleaned version of abrasive for later use (at a smaller fine setting) if desired.

Insert 492 includes bottom wall 494 upon which rests absorption mat 496 which preferably is a rubber pad of 2 to 4 cm in thickness. Pad 496 can be a single thickness pad as shown in FIG. 14 and is used in conjunction with a filling of the barrel with water prior to start up to avoid initial direct contact between the two. Some alternative pad designs include a cone shaped pad whose tapered side walls help deflect some of the direct energy. Alternatively, the rubber pad can be provided with a series of circular holes which are sized to snugly receive tapered inserts which tapered inserts can include used nozzle inserts 470 arranged in a tightly packed manner (e.g., ⅛ to ½" spacing between the circular holes receiving the base of the inserts). FIG. 14A illustrates a cross-sectional view of this later deflection mat embodiment.

Attached to the open upper end 498 of insert 492 is annular lid 500. Lid 500 includes internal flange 502 which is rigidly fixed to upper end 498 of insert 492 (e.g., welding). Lid 500 includes an external hook shaped rim 504 as well as intermediate recess area 506. Also, handles 507 are provided for easy removal and insertion of insert assembly 490 into drum 516. As also shown in FIG. 15 the hook shaped rim 504 of lid 500 frictionally engages with the upper open end 517 of drum 516. An optional extended top inlet port member 508 can be provided. Top inlet port member 508 includes receiving extension 510 having throughhole 512 as well as annular base 514 having a periphery which rests upon upper end 498 of insert 492 and/or upon the top of flange 502 and is preferably fixedly joined therewith (e.g., welding). Top port member 508 can be formed of a high strength material if desired so as to further the life thereof despite the abrasive quality of the fluid jet, especially if a 4th and 5th axis arrangement is utilized as member 508 would provide a focusing function with respect to the waste water and abrasive (and would be sized to handle the extreme angles capable of being achieved during 4th and 5th axis manipulation).

FIG. 15 illustrates capture tank 488 which is comprised of barrel 516 and the aforementioned energy absorption insert assembly 490. Any suitable tank or barrel can be relied upon, but a preferred embodiment of the present invention is a standard 55 gallon plastic or metallic drum or barrel. These are preferred as they are standard devices in other fields of use and are relatively inexpensive. During initial startup, the bottom of the drum can be protected by the inclusion of a quantity of abrasive material which absorbs a sufficient amount of the energy of the fluid jet. This abrasive can be used alone or in combination with additional energy absorption means such as a rubber pad as discussed below.

The earlier described moving platform 174 with rollers 178 is dimensioned so as to snugly receive the bottom of barrel 516. FIG. 15 also illustrates fluid exit tube 518 which is threaded or otherwise affixed to the standard opening provided in drum 516 (or otherwise provided if some other type of receptacle is used). The opening in drum 516 is preferably from 3% to 50% down from the top of the drum with 100% representing the entire height of drum 516. Tube 518 can extend out to a settling tank or the like or, rather, a fixed or flexible nozzle such as 180 described in FIG. 3 in combination with a chute such as 182 can be utilized.

With reference to FIGS. 15 and 16, FIG. 15 illustrates an embodiment wherein cylinder 492 is solid except for upper perforations 499. The scrap and solid abrasive builds up in the interior of insert 492 while fluid and some floating scrap passes out of perforations 499 and travels out of exhaust 488 with some additional scrap and extraneous abrasive settling into the bottom of drum 516 external to the insert FIG. 16 illustrates an arrangement featuring either mesh 491 or small perforated 491' insert 490 whereby the mesh or small perforated insert acts as a screen to differentiate small scrap and small abrasive particles from a certain size abrasive material suitable for reuse. These mesh and small perforation inserts can be sized as are the meshes used by abrasive suppliers to sell different size abrasives. FIG. 16 illustrates the fluid/abrasive/scrap jet (or just fluid and scrap if abrasives are not relied upon for cutting) within capture tank assembly 488 being in a turbulent state. The incoming combination jet creates a turbulent flow condition within insert assembly 490 after sufficient fluid is introduced. As shown by the curved arrows in FIG. 16, turbulent conditions arise in the interior of cylinder 492 while the larger abrasive settles in the middle insert cylinder 492 and the scrap and smaller sized work abrasive material passes through the appropriately sized screening mesh for settlement in tank 516 external to cylinder insert 492. In this way, appropriately sized abrasive is kept for reuse in cylinder 492 while water is built up in drum 516.

To avoid rapid degradation of the rubber insert the bottom of the barrel can, rather than being filled with fluid, be initially filled with a thin layer of the abrasive material or the like to provide an added degree of protection by absorbing some of the initial thrust of the jet. The cleaned garnet in tank 516, within the center insert can be re-used for finer cutting requirements, while the scrap and other material which eventually builds up in the drum can be easily recycled or disposed of upon sliding the moving platform with drum out from below the work table and lifting, via handles 507 the insert out. If top insert member 508 is used, the top can be hinged at one side and releasably fastened at an opposite side to provide for easy removal of cleaned abrasive therein.

As shown in FIGS. 15 and 16, fluid exhaust tube 518 allows for the exiting of the fluid as the solid material builds up in the drum so as to extend the period between the time the drum needs to be removed. Also, a plurality of drums on individual moving platforms can be provided so as to provide for quick replacement and restart upon reaching the point where a drum is full and ready for removal. FIG. 16 further illustrates an additional feature of the present invention which represents an optional feature. This additional feature in FIG. 16 is vacuum line 520 which is either in a side position just below lid 500 or alternatively provided toward the radial exterior portion of intermediate recessed area 506. With the latter positioning of vacuum line 520, a standard drum need not be modified as the vacuum port can be provided in the insert assembly 490 instead. The recessed nature of lid 500 also provides a capture area for scrap work.

FIGS. 17 and 18 illustrate in cut-away and partly in cross-section an improved intensifier 522 of the present invention. In FIG. 17, only one-half 524 of intensifier 522 is fully illustrated as the opposite half 526 is the same. As shown in FIG. 17, intensifier 522 includes double ended cylinder assembly 245 which acts to reciprocate piston shafts 530 and 532 via the hydraulic motor of assembly 242 (FIGS. 3–5). When piston shaft 530 is being retracted valve 252 is switched over to allow for low pressure water (e.g., from the reverse osmosis purifier or straight from a public source or from a recycling tank after passing through a filter) to enter the cylinder. The water is introduced through line 240 into the check valve 252 mounted at one end of intensifier 522. Check valve 252 also is connected to high pressure tube 248 and switches between feeding high pressure water to main nozzle head valve 248 (FIG. 3) and allows low pressure water into intensifier 522.

Bellows 544 of intensifier 522 abuts end 540 of intensifier tube 542 and is fixed thereto to form a fluid tight connection (only the ends of bellows 544 being shown for added clarity with respect to other components). Within bellows 544 are positioned inner and outer flow liners 546 and 548. Inner flow liner 546 slides within outer flow liner 548 and is secured, and thus sealed off at one end to the end of shaft 530 (and to the corresponding end of bellows 544 if desired). Also, shaft 530 is preferably releasably secured to bellows 544. In one embodiment of the invention, the end of the bellows joined to the shaft features a cylindrical block of material (not shown) having two holes on opposite axial ends. The end of the bellows features a clamp ring which is secured about the exterior, intermediate section while a first hole of the block receives the end of the shaft and the second hole the adjacent flow liner. The bellows is designed to be at a ½ state of total compression when in a "relaxed" state. Also, the flow liners are provided to avoid rushing water coming in contact with the interior of the bellows member and creating a resonance problem. The flow liners need not, however, be in sealing contact as they are used only to direct the travel of the rushing fluid and leakage out of the flow liners is not a concern as the bellows is fluid tight and capable of withstanding high pressures.

As shown in FIG. 18 bellows 544 can be easily assembled by joining together (e.g., welding) the peripheral ends of a plurality of stacked bellville spring washers along the common outer periphery and inner, annular base of each. FIG. 18 shows peripheral weld 550 and an interior weld 552. The exterior diameter of bellows 544 is made so as to allow for some degree of radial expansion and the longitudinal shifting upon expansion and compression.

While shaft 530 is being returned to its non-extension position water is thus drawn in so as to fill interior and exterior flow liners 546 and 548. While this is occurring the opposite shaft is pumping up a previously filled cylinder for eventual release at the desired pressure. Double ended cylinder assembly 245 preferably provide a 40:1 intensification ratio, and also preferably represents a slow stroking, double acting intensifier section which achieves, for example, one gallon per minute maximum flow at maximum output (55,000 psi) operating pressure. Suitable over-pressurization valves are also included although not shown to facilitate an automatic high pressure bleed down valve activated by an emergency stop.

One advantage of bellows 544 over the prior art systems, which relied upon high pressure seals and hydraulic oil seals to prevent commingling of water and hydraulic oil, is that the bellows 544 replaces the water seal used by the prior art piston assembly. Breakdown in the water seals in the prior art systems, led to intensifier overhauls which were often required every 150–300 hours of use as without such maintenance steps a common occurrence was to have the seals degrade so as to introduce contaminants in the line which can cause problems downstream either from the standpoint of seal material or leakage of the hydraulic oil. The bellows arrangement of the present invention, however, not only acts to provide an automatic return, but also removes the requirement for a water seal on the reciprocating piston while also isolating the pressurized water from the hydraulic system. Also because of its extended length, bellows 544 provides a low fatigue assembly that can extend the time period between overhauls.

Fluid exiting from the intensifier passes through looped pressure tubes 248, 250 extending away from the intensifier and enters into inlet high pressure cylinders 556 and 558 of attenuator 256. The looped arrangement for the tubing extending between the intensifier 522 and attenuator 558 is preferably provided at each end as the loops help avoid the introduction of elbows into the line. Thus, under the present invention the high pressure fluid conduit system is entirely free of any elbows. Inlet tubing 250, which receives the high pressure water output from the side 526 of intensifier 522 (not shown in FIG. 17) extends into attenuator 558 as shown in FIG. 19.

Under the prior art systems, a separate filter was typically placed between the output of the attenuator and the head assembly. This filter was designed to catch contaminants such as the aforementioned seal components so as to avoid the more costly situation of having to refurbish the head assembly. As the bellows members prevent hydraulic fluid and sealing components from coming in contact with the water, it is possible to not use a downstream filter. For additional security against nozzle head degradation, however, and in view of the potential for sand or the like being in the water (e.g. sand in a public water source when a reverse osmosis water purifier or other type of filtering system is not utilized) it is preferable to include a downstream filter. Also, as a feature of the present invention is to provide efficient positioning and assembly of the components in the present invention, the present invention features a fluid jet system filter assembly 565 that is provided as an integral component of attenuator 256 and is positioned internally within the attenuator to reduce the fluid conduit length so as to lessen the energy loss in the system.

For example, under many prior art systems, 50 feet of piping and tubing was typically involved with numerous elbows positioned in line. This was partly due to the non-compact nature of the prior art's system and, when applicable, the added length required for gantry shifting of the nozzle head. Rather than the placing of a separate filter downstream from the attenuator, the attenuator of the present invention, as noted above, is designed so as to provide support for a filter or filters. Thus, in addition to decreasing the total tubing length, the inclusion of the filter in the attenuator makes efficient use of the components available so as to reduce the added cost of the filter housing and connections.

Figure 19:
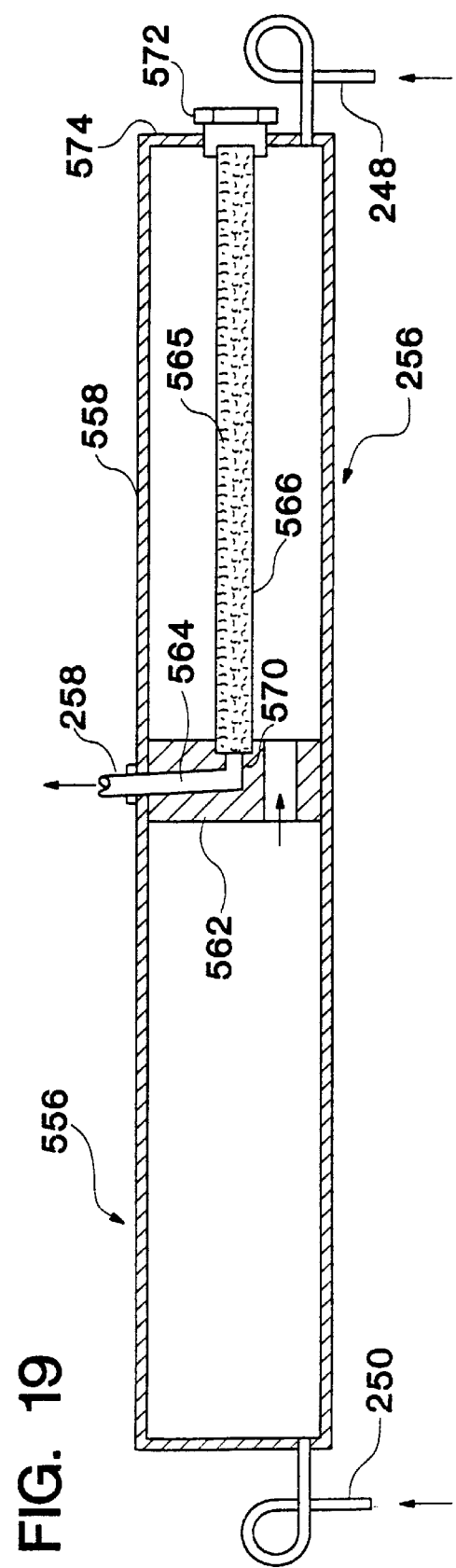
FIG. 19 shows a cross-sectional view of an attenuator of the present invention.

Attenuator 256 in FIG. 19 features cylindrical tubes 556, 558 with sealed off or capped outer ends. FIG. 19 further illustrates fluid passageway block 562 which includes outlet passage 564 in fluid communication with high pressure conduit 258 which extends to nozzle head assembly 170. Depending on which stage the intensifier is at, fluid either (1) enters through conduit 248, passes through filter 566 out to passageway 564 and then into conduit 258 or (2) passes through line 250 and into attenuator tube 556, passes through port 568 formed in block 562, through filter 566 and out through passageway 564 and then into conduit 258. Alternatively, passageway 564 can be in a T-shaped configuration and a second filter assembly similar to filter assembly 565 can be provided on the opposite side whereby port 568 would then not be required. This later embodiment has the advantage of providing a greater length of time between filter changes, but added material and components. Filter 566 can take on any of the forms presently used in the prior art in the downstream filter housings. For example, a perforated tube with sealed metal elements designed to trap any extraneous material passing with the fluid can be relied upon. For ease in maintenance, filter 566 is received within recess 570 formed in block 562 by compression (or simple axial locking in position) created by block 562 and is fixed to nut 572 threadably received at the capped end 574 of cylinder tube 558. Thus, when filter 566 is to be cleaned or replaced, it can be removed simply by loosening nut 572 and withdrawing filter 566 through the opening.

FIG. 20 shows a preferred abrasive material feeding assembly 580 which features main feed conduit 582 connected at one end to abrasive feed introduction assembly 584. Introduction assembly 584 includes tapered nut connector 586 which fixes the end of conduit 582 in a manner similar to that described for the embodiments of FIGS. 13 and 20A. Introduction assembly 584 includes Y-branch housing 588 which has opening 590 for receipt of abrasive material from vibrating feeder 236 positioned below supply 594 with outlet valve 596 which can be automated or manually controlled. Housing 588 includes throughhole 593 which is in communication with the end 600 of conduit 582 at its bottom and in communication with air supply lines 602 at its top. A supply line 602 in conjunction with Y-branch housing 588 provides a forced feeder arrangement in the present invention. This force feeder system is particularly well suited for use with the abrasive inlet conduit support assembly 424 which includes splitter 603 in communication with the multiple sub-conduits 604, 606, 608 and an additional one not viewable from FIG. 20 as it is aligned with conduit 606.

FIG. 20 also shows fourth axis shifting lines 173 (along the X-axis) which the nozzle assumes upon rotation of the main body of nozzle head assembly 170 with respect to support 171. A fifth axis movement along the Y-axis is also possible. The driving means for shifting main body along these axes can be a conventional one like those used in milling machines and the like.

As shown in FIG. 22, splitter 603 is positionable above the main valve 259 feeding fluid to nozzle head assembly 170. The diameter of main conduit 582 and those of sub-conduits such as 604, 606 and 608 are sized to provide the desired velocity of abrasive into nozzle head assembly 170 while avoiding too high a degree of air in the line. Thus, air supply conduit is under relatively low pressure (2–10 psi) and with a pressure in this range an internal diameter of 0.250–0.375" for the main conduit and 0.125–0.250" for each of the four sub-conduits such as 604, 606 and 608 is suitable. Also, splitter 603 has an inlet port similar in diameter to main conduit 582 and branch ports similar in diameter to sub-conduits such as 604, 606 and 608.

Also, to help even the volume of abrasive to the sub-conduits, conduit 582 is arranged so as to have a straight section 610 extending up from splitter 603. This can be provided by a reinforced end in conduit 582 and/or an extension such as extension 612 shown in cross-section in FIG. 20. This force feeder arrangement of the present invention increases the speed of abrasive mixing with the fluid jet so as to improve cutting efficiency and also allows for a wider latitude of relative positioning between the source and the nozzle head assembly 170. As described earlier, nozzle head assembly 170 is supported by mounting member 171 of A-frame 168 extending from rigid Z-axis support assembly 140. Each of sub-conduits such as 604, 606 extend through reception heads, such as 614, 616 and 618 supported on housing 426 and extending inwardly in a manner similar to that shown in FIG. 20 as earlier discussed. Housing 426 is supported by main body 406 and nozzle tube 472 held by collet 458.

FIG. 21 illustrates an alternative embodiment of the present invention wherein supply sack 620 is formed with outlet aperture 622 with a cord or automated release or the like as opposed to an integral valve assembly which represents an alternate embodiment of the invention. The open end of sack 620 dumps out into a funnel member 624 which can be one of four funnel members designed to receive a respective end of a sack provided in an arrangement similar to that shown in FIG. 4. The funnels and vibrating feed chute 236 are connected to appropriate supports 625 on raised platform 192. Also the exit end of feed chute 236 can feed into a force feeder arrangement such as 584 in FIG. 20 with the force feeder housing being supported by or within the platform 192 and having an outlet conduit extending to the nozzle head assembly 170. Funnel 624 opens into valve 626 which is preferably electrically controlled and in communication with the control means. Suitable electronic valve signal lines and valve position monitoring lines for use by a controller can also be provided to valves 236 in the sacks shown in FIGS. 3–5. The feeder chute's motor can also be electronically controlled by the controller so as to run only during the times abrasive is being fed. Sacks 620 can be easily slid on as described previously and the added swinging feature of this arrangement allows for the outlet end 622 of the sack to be swung over the outer edge of the rim of funnel 624 once loop 230 is supported on rod 206.

Figure 23:
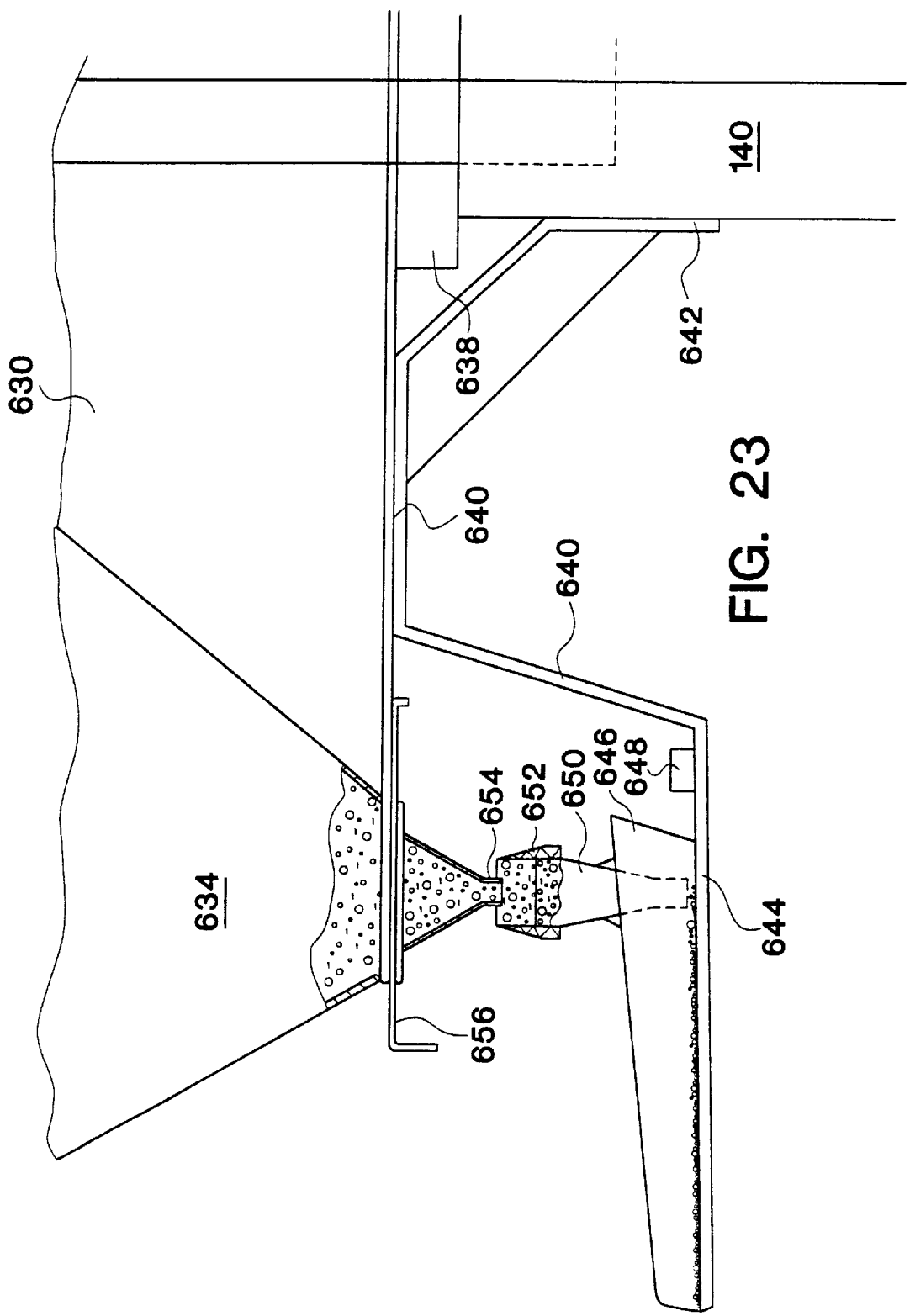
FIG. 23 shows a more detailed view of the carousel abrasive feed assembly shown in FIG. 22.

FIG. 22 illustrates an alternate embodiment of the present invention both from the standpoint of workpiece supply and abrasive feed supply. The system shown in FIG. 22 is the same as that for FIGS. 3–5, except where described below. Fluid jet systems 628 in FIG. 22 features abrasive feed carousel cell 630 which features a plurality of (e.g., 4) abrasive holders, three of which are shown and designated 632, 634 and 636. FIG. 23 provides a closer view of carousel 630 in the area of bin or abrasive holder 634. Carousel 630 rotates upon bearing member 638 through suitable drive means (not shown). Bearing 638 is supported at the top of the Z-axis support assembly 140. Bottom plate 640 of carousel 630 is supported in rotating fashion on bearing 638 about the central axis of Z-axis support assembly 140. Frame assembly 640 is secured to Z-axis support assembly 140 at one end, 642, and has an opposite end 644 which supports feeder chute 646 and vibration producing means 648. With this arrangement the abrasive can be fed by gravity alone to a vibrating feeder chute and multiple abrasive types can be easily switched into position.

Feeder chute 646 also supports nozzle 650 which has flexible collar 652 designed to bend out of the way to receive outlet extension 654 forming the bottom of bin 634. A similar arrangement can be used in the abrasive feed embodiment of FIG. 20. Frame assembly 640 is designed to provide added support with respect to carousel 630, although the extension of bearing 638 is relatively far out so as to provide sufficient support even when carousel 630 is fully loaded. As the individual compartments in carousel 630 allow for rapid switch over to different materials, the device is particularly useful for job shops and the like which are processing a plurality of different types of work products.

FIG. 23 also shows sliding gate valves 656 supported at the level of the bottom of carousel 630 which can be either hand manipulated or automatically controlled and placed in communication with control means. Moreover, bin rotation can also be automated and based upon a program provided by the control means. Thus, an operator can readily switch between more expensive and less expensive abrasive material (e.g., differences in price between abrasives such as copper slag, garnet, walnut shells as well as materials such as salt and sugar which can be used for food product processing)

FIG. 22 also illustrates an alternate manner of feeding and processing sheet material. In the embodiment of FIG. 22, supply roll 658 of a sheet of material to be processed is slid under nozzle head assembly 170 due to the driving action of sheet feeder 661 which is preferably fixed to the closest edge of X-axis frame structure 136. Depending upon the weight and thickness of the material, rollers 658 and 660 can either be supported directly by the Y-axis shifting table such that each roller moves with the Y-shifting table. Alternatively, and more preferably, each of roller 658 and 660 is supported by suitable stands 662 and 664 and the sheet is fed to the sheet feeder 661 in an untensioned state such that it can be shifted to some degree along the Y-axis with the moving Y-axis support table after being fed along the X-axis and through sheet feed 661. (Since the material is somewhat flexible, is in an untensioned state between the roller supply and sheet feed, and the cut-outs are typically within a small X-Y area, the X-Y shifting does not present a problem in this embodiment.) Alternatively, stands 662 and 664 can feature a front and back support member and shafts 666 and 668 extending between the respective front and back supports as well as hydraulic extenders (not shown) designed to shift the roll 658 and 660 in unison either forward or back in use with the table. Also, magnetic clamp bars can be further provided for maintaining proper positioning of the work material below nozzle head assembly 170 or, in other words, to maintain the position while the X and/or Y frame structure shifts.

Alternatively, sheet 674 can represent a conveying means for a pallet or the like positioned on sheet 674 for positioning workpieces below nozzle head assembly 170. A pallet/continuous conveyor feed arrangement is particularly useful if the same shape or similar shape cut is to be made in each sheet whereby the conveying sheet can be originally continuous and then recycled in controlled fashion to place the cutout area in the sheet's interior to be positioned under the nozzle each time a cut is to be performed. Also rather than feeding onto the roll, the sheet 674 when acting as a conveyor sheet can be an endless chain arrangement that travels on the X-axis sides of the upper supporting frame structure for continuously feeding platens or the like which are supported by the chain arrangement which can include Y-axis support bars supported by a pair of spaced chain loops.

The present invention also includes the unique feature of using thin magnetic sheets laid over a planar workpiece sheet so as to fix the workpiece between the magnetic plate and the underlying metallic structure of the supporting work table (or conveying sheet or lattice arrangement). Again, these sheets can be used repeatedly if the shape of the cut is essentially the same or at least until the sheet is so degraded as to be unable to perform its hold down function and prevents an undesirable shifting of the workpiece which often is a thin sheet ($\frac{1}{1000}$") of metal foil.

Figure 24:
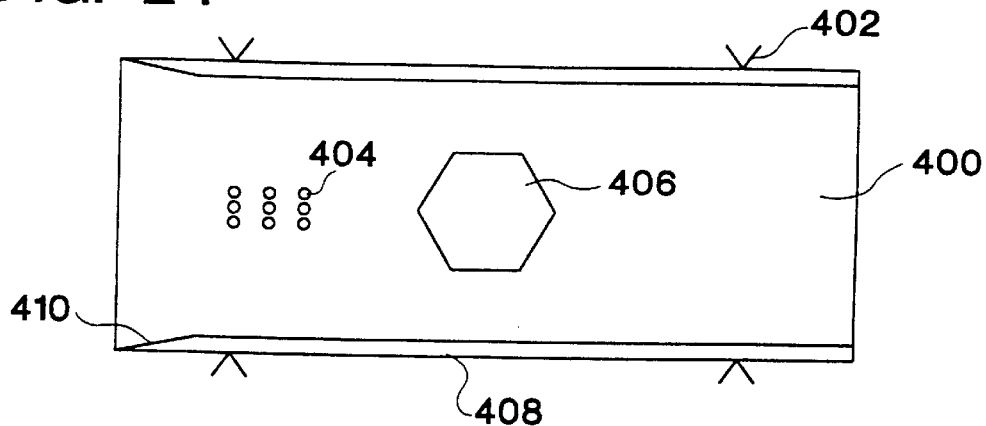
FIG. 24 shows a die plate for use in the present invention.
Figure 25:
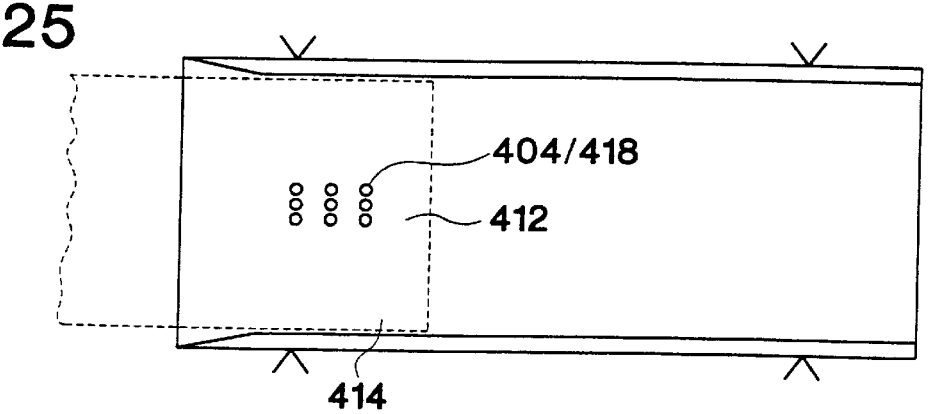
FIG. 25 shows a die plate of FIG. 24 with a workpiece sheet fed to a first processing position.
Figure 26:
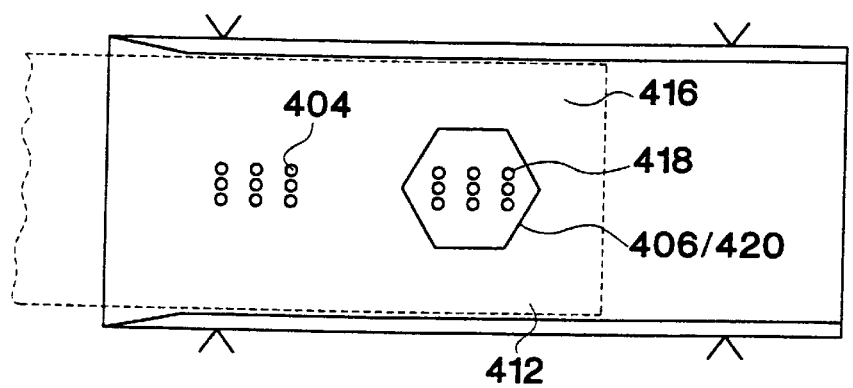
FIG. 26 shows a similar view as that of FIG. 25 with the workpiece in a second processing position.

FIGS. 24–26 illustrate a sequence of operation for forming relatively complex products through use of a fluid jet cutting system. FIG. 22 shows die 400 which is supported to X-Y table assembly 102 through support rails such as in FIG. 8 with this support being represented schematically by support markers 402. Die plate 400 includes first pattern 404 and second, downstream pattern 406. Die plate 400 can also be provided with side rails 408 with diverging inlet 410.

Figure 27:
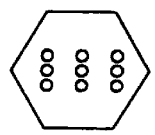
FIG. 27 shows a resultant workpiece produced from the die of FIG. 24.

FIG. 25 illustrates workpiece sheet 412 at a first processing position 414 after being fed from sheet feeder 661 or the like. (Alternatively, a single, rectangular sheet as opposed to a continuous sheet can also be relied upon whereupon die plate 400 can have a four sided rim and/or a magnetic blanket as described above which could be used over and over if a similar pattern cut is used repeatedly.) Once in position 414, the X-Y table assembly is manipulated to form the six circles shown. Once these are completed sheet 412 is then placed in second processing position 416 upon die plate 400 being shifted to the left via X-Y table assembly 102, as shown in FIG. 26. Once in this position, workpiece 412 and the cut pattern 418 are positioned over die cut 406 whereupon cis 420 is made to produce product 422 shown in FIG. 27. The workpiece can then be fed up and/or die plate 400 repositioned to place an uncut position of workpiece 412 between die cuts 404 and nozzle head 170. This arrangement thus provides for a fast cutting process for sheet material which ordinarily would be difficult to support across a large open area due to its highly flexible nature. Also, the sheet material extending from the supply roll to the sheet feeder device supported by the X-Y table is sufficiently flexible to provide for X-Y table movement to achieve the cut patterns.

Figure 28:
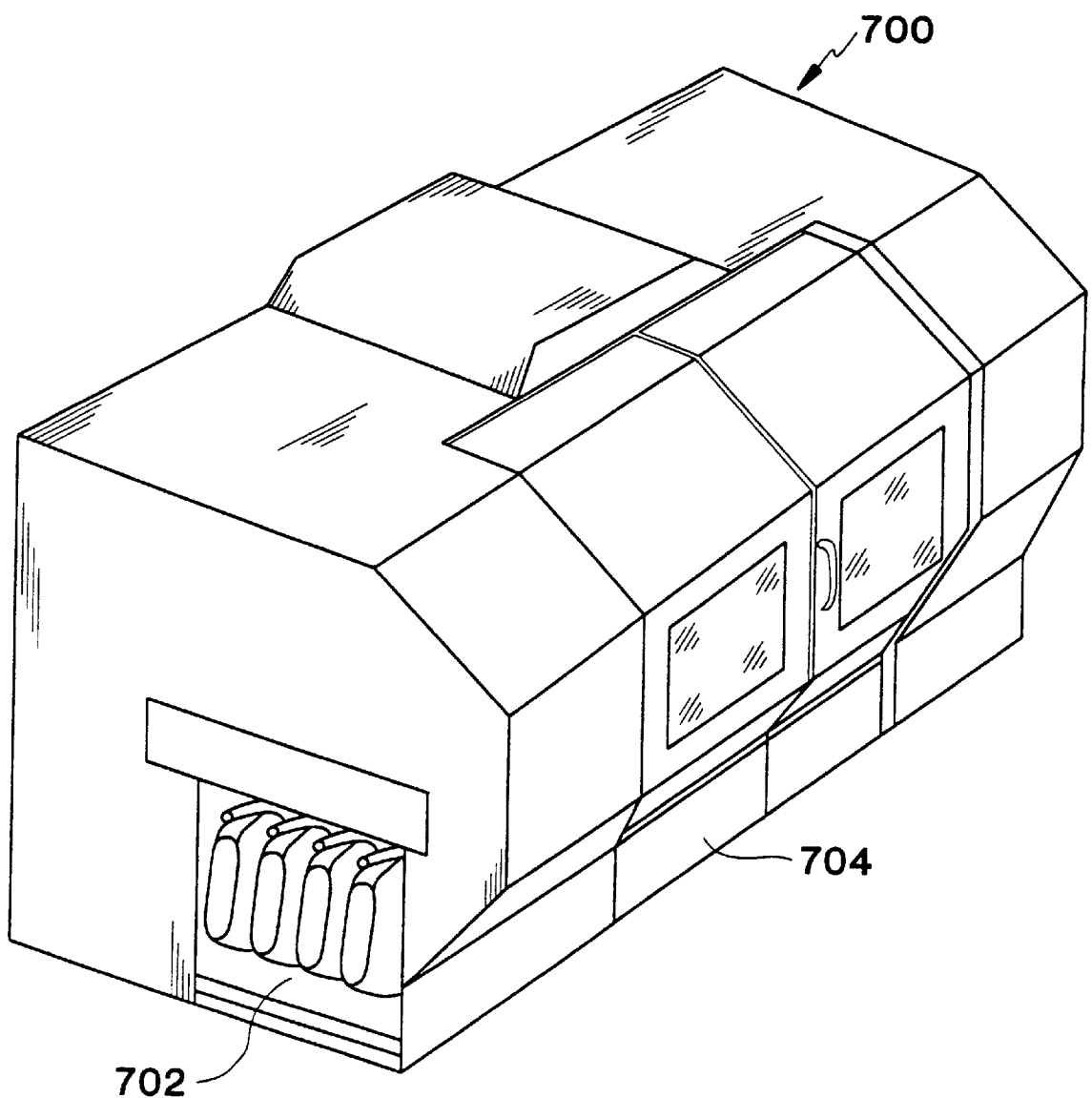
FIG. 28 shows the fluid jet system contained in its entirety within a containment housing.

FIG. 28 illustrates the entire fluid jet system 100 of FIG. 3 in self-contained housing 700. The self-contained housing 700 avoids the problem associated with conventional systems such as that shown in FIG. 2 which involves the creation of a messy working environment. Housing 700 has an access opening 702 for reception of bags of abrasive on the sloping support posts (or one or more bins). Although not shown, a door can also be provided for further sound dampening purposes although a sealing wall arrangement is provided inward of the posts.

Doors 704 are provided for gaining access to the abrasive catch tank or drum positioned between the Y-axis platforms. Additional access doors (not shown) can also be provided for gaining access to the electrical closet and intensifier, for example.

Although the present invention has been described with reference to preferred embodiments, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. A nozzle head assembly, comprising:
   a main body having a main body fluid passageway and at least three abrasive ports formed therein, said abrasive ports being circumferentially spaced about said main body and each of said ports both independently opening into the fluid passageway and out at an exterior surface of said main body, and each of said ports having a respective central axis, each central axis forming an acute angle with a central axis of said main body fluid passageway; and
   a nozzle conduit extending out away from said main body and being in fluid communication with said main body fluid passageway,
   and said nozzle assembly defining a mixing chamber within said main body fluid passageway, and said nozzle assembly further comprising first, second and third abrasive flow tubes respectively received within said abrasive ports and which abrasive flow tubes extend out from said main body along a common axis with respect to a central axis of said at least three abrasive ports formed in said main body.

2. A nozzle head assembly as recited in claim 1 further comprising a fitting for joining a high pressure fluid conduit to said main body such that high pressure fluid is directed through said main body fluid passageway, an orifice member positioned within said main body fluid passageway for accelerating high pressure fluid passing therethrough and a wear insert positioned within a section of said main body fluid passageway and below said orifice member, and said wear insert having a wear insert throughhole in fluid communication with the main body fluid passageway and a plurality of abrasive conduits, said wear insert being in direct contact with said main body such that said abrasive conduits are directly fed by said abrasive ports so as to define an interior portion of common dimension abrasive feed channels defined by the interior of said abrasive flow tubes, said abrasive ports and said abrasive conduits of said wear insert.

3. A nozzle head assembly as recited in claim 2 wherein said abrasive feed tubes, extend both inwardly into said main housing and outwardly away from said main housing at said acute angle, and are held in position by a surrounding, compressing member provided on the exterior surface of said main body.

4. A nozzle head assembly as recited in claim 3 wherein said abrasive feed tubes extending inwardly until coming in contact or essentially in contact with said wear insert such that abrasive particles can be passed through said main housing without coming in contact with said main housing.

5. A nozzle head assembly as recited in claim 4 further comprising a tube fixing means for fixing said abrasive tube in position with respect to said main body, said tube fixing means including a tapered nut for clamping said abrasive tube in position which is threadably received by a threaded reception area supported by said main body.

6. A nozzle head assembly as recited in claim 5 wherein said threaded reception areas are defined by a threaded portion of an outward end of each of said abrasive ports, and said tapered nut is formed of a plastic material.

7. A nozzle head assembly as recited in claim 1 further comprising a collet member having a hole formed therein through which said nozzle conduit extends and said main body including a corresponding shaped reception cavity for receiving said collet, and said nozzle head assembly comprising a lock member releasably joined with said main body and for varying the degree of compression forces acting on the exterior of said collet, and said nozzle conduit being releasably fixed within the hole formed in said collet.

8. A nozzle head assembly as recited in claim 7 wherein said lock member is a cup-shaped member which is threadably, adjustably secured to said main body and has an internal, bottom surface for contacting with a bottom surface of said collet, and a top surface of said collet being positioned for preventing escape of said wear insert.

9. A nozzle head assembly as recited in claim 8 further comprising an elastomeric member that is positioned between the surface of said collet and said wear insert and is in contact with each so as to bias said wear insert into a desired position.

10. A nozzle head assembly as recited in claim 1 wherein said acute angle is from 15 to 25°.

11. A nozzle head assembly as recited in claim 1 wherein there are at least four of said abrasive ports equally spaced about said main body.

12. A nozzle head assembly as recited in claim 1 further comprising a disc shaped splash guard extending about said nozzle and supported by said main body.

13. A nozzle head assembly as recited in claim 1 further comprising edge detectors which are circumferentially spaced around said nozzle conduit.

14. A nozzle head assembly as recited in claim 1 further comprising a collet member having a frusto conical shape and a central hole through which said nozzle conduit extends; a cup shaped locking member for locating said collet in position with respect to said main body and an edge detector which has a diameter corresponding to that of said nozzle conduit for reception by said collet once said nozzle conduit is temporarily removed.

15. A nozzle head assembly as recited in claim 1 wherein said nozzle conduit has a weakened ring area which is of a lesser impact strength than a remainder of an exposed portion of said nozzle conduit.

16. A nozzle head assembly, comprising:
    a main body having a centralized fluid passageway and at least three abrasive ports formed therein, said abrasive ports being circumferentially spaced about said main body and each of said ports both independently opening into the fluid passageway and out at an exterior surface of said main body, and each of said ports having a respective central axis, each central axis forming an acute angle with a central axis of said centralized fluid passageway; and
    a nozzle conduit extending out away from said main body and being aligned with said centralized fluid passageway, and said nozzle head assembly further comprising a fitting for joining a high pressure fluid conduit to said main body such that high pressure fluid is directed through said centralized fluid passageway, an orifice member positioned within said centralized fluid passageway for accelerating high pressure fluid passing therethrough and a wear insert positioned within a hollow formed in said main body and below said orifice member, and said wear insert having a central throughhole in fluid communication with the centralized fluid passageway and a plurality of abrasive conduits, which are in communication with said abrasive ports, essentially share a common central axis with that of said abrasive ports, and open into the central throughhole.

17. A nozzle head assembly as recited in claim 16 further comprising abrasive feed tubes which are received within respective abrasive ports and extend inwardly into said main housing.

18. A nozzle head assembly as recited in claim 17 wherein said abrasive feed tubes extend inwardly until coming in contact or essentially in contact with said wear insert such that abrasive particles can be passed through said main housing without coming in contact with said main housing.

19. A nozzle head assembly, comprising:
a main body having a centralized fluid passageway and at least three abrasive ports formed therein, said abrasive ports being circumferentially spaced about said main body and each of said ports both independently opening into the fluid passageway and out at an exterior surface of said main body, and each of said ports having a respective central axis, each central axis forming an acute angle with a central axis of said centralized fluid passageway; and
a nozzle conduit extending out away from said main body and being aligned with said centralized fluid passageway, and said nozzle head assembly further comprising a collet member having a hole formed therein through which said nozzle conduit extends and said main body including a corresponding shaped reception cavity for receiving said collet, and said nozzle head assembly comprising a lock member releasably joined with said main body and for varying the degree of compression forces acting on the exterior of said collet, and said nozzle conduit being releasably fixed within the hole formed in said collet.

20. A nozzle head assembly as recited in claim 19 further comprising an elastomeric member that is positioned between the surface of said collet and a wear insert and is in contact with each so as to bias said wear insert into a desired position.

21. A nozzle head assembly as recited in claim 19 further comprising an edge detector having a diameter corresponding to that of said nozzle conduit for reception by said collet once said nozzle conduit is temporarily removed.

22. A nozzle head assembly, comprising:
a main body having a centralized fluid passageway and at least three abrasive ports formed therein, said abrasive ports being circumferentially spaced about said main body and each of said ports both independently opening into the fluid passageway and out at an exterior surface of said main body, and each of said ports having a respective central axis, each central axis forming an acute angle with a central axis of said centralized fluid passageway; and
a nozzle conduit extending out away from said main body and being aligned with said centralized fluid passageway, and
wherein said nozzle conduit has a weakened ring area which is of a lesser impact strength than a remainder of an exposed portion of said nozzle conduit.

23. A nozzle head assembly, comprising:
a main body having a high pressure fluid conduit fitting at a first end, and an internal passageway extending from said first end to a second end of said main body;
a nozzle conduit supported by said main body at said second end and having an opening in alignment with said internal passageway;
an orifice member received within said passageway and supported by said main body between said first and second ends;
a first, a second, and a third abrasive port formed in said main body with each having an inlet end on an external portion of said main body and an outlet end opening out into said internal passageway of said main body at a level of said internal passageway between said orifice member and an inlet end of said nozzle conduit, each of said abrasive ports having a central axis arranged at an acute angle with respect to a central axis of said internal passageway;
a first, a second, and a third abrasive feed tube having a first end in communication with an abrasive supply source positioned external to said main body and a second end which extends into a respective one of said abrasive ports at a location internally within said main body.

24. A nozzle head assembly as recited in claim 23 further comprising a common abrasive supply source to which the first end of said abrasive feed tubes are attached.

25. A nozzle head assembly as recited in claim 24 wherein each of said abrasive feed tubes include a curved section positioned between said common abrasive supply source and the external portion of said main body.

26. A nozzle head assembly as recited in claim 24 wherein said common supply source includes a multi-port splitter having a main abrasive inlet port and three outlet ports in communication are said first, second and third abrasive feed tubes.

27. A nozzle head assembly as in claim 23 wherein said main body is a monolithic or unitary body.

28. A nozzle head assembly as recited in claim 23 where each of said abrasive ports and abrasive feed tubes share a common central axis that extends along a straight line continuously between the outlet ends of said abrasive ports and the external portion of said main body.

29. A nozzle assembly as recited in claim 28 wherein said straight line forms an acute gravity feed assistance angle of 25° or less.

30. A nozzle head assembly as recited in claim 23 wherein said abrasive supply tubes are formed of a material that is sufficiently flexible to allow for a roll supply of said abrasive feed tubes.

31. A nozzle head assembly, comprising:
a main body having a high pressure fluid passageway formed therein and an upper high pressure fluid fitting;
a nozzle conduit at a lower end of said main body and in fluid communication with said high pressure fluid passageway of said main body;
an orifice member supported by said main body in line between said high pressure fluid fitting and said nozzle conduit and arranged so as to eject high pressure fluid received thereby into a mixing chamber positioned below said orifice member within said high pressure fluid passageway formed in said main body and above said nozzle conduit;
at least three abrasive feed channels that extend from an external surface of said main body and open into said mixing chamber, said abrasive feed channels extending along a straight line from said external surface to an opening in said mixing chamber which straight line defines an angle of 25° or less.

32. A nozzle assembly as recited in claim 31 wherein said abrasive feed channels are comprised of abrasive feed ports formed in said main body and flow tubes received within said abrasive feed ports, and said abrasive feed channels, starting with a section of said feed tubes external to said main body and extending from the exterior of said main body to said mixing chamber in said main body, remain of a common cross-sectional dimension and of a continuous acute angle orientation.

* * * * *